(12) United States Patent
Tsunekane et al.

(10) Patent No.: US 6,822,985 B2
(45) Date of Patent: Nov. 23, 2004

(54) LASER-DIODE-PUMPED SOLID-STATE LASER APPARATUS AND STATUS DIAGNOSTIC METHOD OF THE SAME

(75) Inventors: Masaki Tsunekane, Tokyo (JP); Katsuji Mukaihara, Tokyo (JP)

(73) Assignee: Laserfront Technologies, Inc., Kanagawa (JP)

( * ) Notice: Subject to any disclaimer, the term of this patent is extended or adjusted under 35 U.S.C. 154(b) by 12 days.

(21) Appl. No.: 10/091,487

(22) Filed: Mar. 7, 2002

(65) Prior Publication Data

US 2002/0126724 A1 Sep. 12, 2002

(30) Foreign Application Priority Data

Mar. 7, 2001 (JP) ........................................ 2001-063331

(51) Int. Cl.[7] .............................................. H01S 3/13
(52) U.S. Cl. ................. 372/29.021; 372/29.02
(58) Field of Search ................... 372/29.021, 29.02, 372/75, 69, 70, 72

(56) References Cited

U.S. PATENT DOCUMENTS

| 5,018,152 A | 5/1991 | Linne et al. | |
| 5,128,949 A | * 7/1992 | Barnes | ..................... 372/25 |
| 5,130,998 A | * 7/1992 | Wakata et al. | ................. 372/32 |

FOREIGN PATENT DOCUMENTS

| JP | A 2-158182 | 6/1990 |
| JP | A 4-356984 | 12/1992 |
| JP | A-5226747 | 9/1993 |
| JP | A 6-268305 | 9/1994 |
| JP | 2000-269576 | 9/2000 |
| JP | A 2002-164596 | 6/2002 |

OTHER PUBLICATIONS

Wenjie Xie, "Fluorescene Feedback Control of a Diode Pumped Solid State Laser," Optics Communications, V, 170, 199, pp. 265–268.

* cited by examiner

Primary Examiner—Don Wong
Assistant Examiner—Cornelius H. Jackson
(74) Attorney, Agent, or Firm—Young & Thompson

(57) ABSTRACT

A laser-diode-pumped solid-state laser apparatus includes a laser rod, and laser diode devices that generate pumping light. Optical unit such as a reflection mirror and an optical waveguide medium is provided at a position in a laser resonator near a laser optical axis and not blocking the optical axis. A photo-detector detects a quantity of fluorescence generated from solid-state laser medium. The fluorescence quantity is compared with a predetermined value or a previously measured value. Thus degradation status of a laser diode light source is constantly diagnosed.

12 Claims, 12 Drawing Sheets

LASER-DIODE-PUMPED SOLID-STATE LASER APPARATUS AND STATUS DIAGNOSTIC METHOD OF THE SAME

BACKGROUND OF THE INVENTION

1. Technical Field of the Invention

The present invention relates to a laser-diode-pumped solid-state laser apparatus and a status diagnostic method of the apparatus. Particularly, the present invention relates to a highly reliable laser-diode-pumped solid-state laser apparatus and a status diagnostic method of the apparatus, which are capable of performing degradation diagnosis for a laser diode simply and easily.

2. Description of the Related Art

A so-called LD (laser diode) pumped solid-state laser, which has a laser diode (hereinafter, abbreviated as LD) with higher absorption efficiency to a laser medium than a lamp and is small, highly efficient and has a long lifetime as a pumping light source, has drawn attention in recent years as a method of pumping light from a solid-state laser medium such as an Nd:YAG. Particularly, an LD-pumped solid-state laser apparatus has been developed in recent years, which emits a laser output reaching a kilowatt by using a few hundred LD's in one resonator.

It is believed that the LD has a more than ten times longer lifetime than the lamp and the LD can be continuously used for as much as 10,000 hours. However, the lifetime is an average and output from some LD's reduces after a few thousand hours, and it is difficult to completely recognize and remove them at initial LD selection. Further, since the LD reduces its lifetime considerably due to disturbances and changes in the external environment, such as static electricity, electric surges from a power source, return light, dust, gas and condensation, it is necessary to detect a quantity of a light pumped from the LD and know a degree of its degradation by some means in order to improve the reliability of the laser apparatus and to deal with a failure quickly.

Accordingly, in the LD for low output operation at 10 W or less, a photo-detector disposed in an LD package detects the energy of the pumping light that slightly leaks from a high reflection surface (rear surface) opposite to an emission surface (front surface) of an LD chip, and it is used for controlling a pumping light quantity or detecting degradation of the LD.

Further, a method has conventionally been used in which a laser oscillation light emitted outside the resonator from an output mirror that composes a solid-state laser resonator is partially split or the photo-detector measures the energy of the oscillation light leaked from a mirror other than the output mirror, thus controlling the laser output or detecting the degradation of LD.

Furthermore, a method has also been proposed, which detects fluorescence intensity or fluorescence distribution in a direction along a laser oscillation optical axis or on its extension. FIG. 1 and FIG. 2 show the method described in Japanese Patent Laid-Open (unexamined) No. 2000-269576. A method is proposed in which a monitoring mirror splits fluorescence emitted from a solid-state laser rod along the laser oscillation optical axis, a CCD camera transforms its pumping distribution into an image for observation, and a drive current for each LD is adjusted individually based on the image to unify the pumping distribution. The prior art will be described as follows.

In the conventional example, FIG. 2 shows a following method. When setting a value of the drive current for each of LD's 102 to 107, excitation is performed first in the state where the mirror of the solid-state laser resonator is removed, variable resistors 122 to 127 adjust the values so as to unify the pumping distribution while a CCD camera 130 observes the pumping distribution, and the resonator mirror is attached again. Further, as shown in FIG. 1, a method is also proposed that a mirror 128 is inserted in the resonator only when measuring the fluorescence distribution in the state where the resonator mirrors 120, 121 are attached, and the CCD camera 130 observes the fluorescence from a laser rod 101 through the mirror 128.

Furthermore, this conventional example describes another method of making a drive power source 117 for LD small, simplifying wirings, and adjusting the drive current for each of the LD's 102 to 107, in which all LD's are connected in series and driven by one power source 117, and variable resistors 122 to 127 are connected to each of the LD's 102 to 107 in parallel, and thus controlling a current value that flows in each LD.

However, an LD chip for high output operation at 20 W or more, which has been widely marketed, has the emission surface of about 1 cm in length. Accordingly, a wide detector is required to detect all the light from the width of 1 cm by the photo-detector provided in a rear position, and output from the photo-detector saturates unless a neutral-density filter is provided before the photo-detector because much light quantity leaks from the rear surface of the chip. As a result, since the configuration for light detection becomes complicate and its cost also increases, the LD for high output operation is not regularly provided with a mechanism for detecting the light quantity in its package in many cases. Moreover, in the case of a configuration called a stack where the LD's are laminated for a semiconductor layer with a narrow gap in a perpendicular direction, photo-detection function is not regularly provided due to little space for providing the photo-detector on the rear surface. For this reason, it has been impossible to directly detect the degradation of LD in the case of a high output solid-state laser apparatus using the high output LD's.

Optical output that can stably operate the LD device having the emission surface of 1 cm in length is from 20 W to the maximum level of about 80 W. Accordingly, a plurality of the LD's need to be used in the case of the high output laser apparatus that requires higher excitation. For example, there is a case where a few tens to a few hundred or even more LD's are used as a pump source with respect to a solid-state laser medium to obtain the laser output in the kilowatt class from the solid-state laser apparatus. When a very large number of LD's are simultaneously used, the number of power sources becomes large if each LD device is individually provided with the drive power source, a wide installation volume is needed, the wirings become complicate, and thus leading to low operation efficiency. Therefore, a few to a few tens of LD's are driven by connecting them electrically in series as a group regularly.

As described, when a large number of LD's are driven in series, it is impossible to increase the drive current for a particular LD to compensate the output reduction of the LD even if individual LD is provided with the photo-detection function and the function can detect the output reduction of the particular LD among the LD's, because a plurality of LD's are electrically connected in series. For example, when compensating the output of the particular LD by increasing the drive current, the output of the other LD's having no output reduction becomes larger than an initial value. Thus, the pumping light output of the whole group increases remarkably, which may lead to increase of the solid-state laser output exceeding an initially set value. In other cases, excitation balance with the LD's of another group becomes unstable, which may conversely lead to reduction or instability of the solid-state laser output or quality reduction of an emission beam. Moreover, when each of a few tens of LD's is provided with the photo-detector, wirings and circuits for controlling them become very complicate, and thus increasing the apparatus cost.

In addition, as a well-known conventional method, it is possible to detect laser oscillation light quantity taken outside the solid-state laser resonator to know indirectly the degree of LD degradation. However, the oscillation light quantity form the resonator does not reduce only due to the LD degradation but also reduces considerably due to alignment slippage of the resonator mirror, stain and damage of the mirror itself, alternation and damage of the laser medium, stain of its coating film or the like. It is difficult to know separately the degree of LD degradation from the light quantity of the laser oscillation light, because the oscillation light quantity is reduced more frequently by a cause other than the LD.

Further, in the conventional methods shown in FIGS. 1 and 2, since the CCD camera needs to be installed along the laser optical axis or on its extension and the fluorescence distribution cannot be observed due to an intense laser beam when the laser is oscillated, the resonator mirror needs to be removed once during measurement of the fluorescence distribution or the mirror is temporarily inserted in the resonator to keep the solid-state laser apparatus from oscillating, which is not practical because the LD degradation cannot be detected during operation. In addition, when a plurality of laser rods are arranged in the laser apparatus in order to obtain high laser output, it is extremely difficult for one CCD camera to observe the fluorescence distribution in a long laser rod or a plurality of laser rods at once from one direction along the laser oscillation optical axis due to a focal distance of imaging and the like. For this reason, a plurality of CCD's, a plurality of mirrors, imaging lenses with various focal distances and the like are required, and thus an optical system becomes very complicate and its cost becomes high.

Moreover, when all the LD's are connected in series and driven by one power source as shown in the conventional drawings, the number of LD's connected in series becomes 20 to more than 30, and the power source becomes very large conversely if a drive voltage exceeds 40V. This is because electronic parts composing the power source become large quickly to cope particularly with an increase of the drive voltage. When the number of LD's to be mounted is large, the power source is individually provided for 20 to 30 LD's as one group to make the overall size of the power source small. Furthermore, one power source deals with a large current and a high voltage, a cooling method of the electronic parts, reduction of durability and reliability, and difficulty of replacement and maintenance due to large size of each part are large problems practically. In addition, when the variable resistors control the drive current for each LD, problems such as heating and drift in the resistor and reduction of operation efficiency also occur.

The findings that the inventor has obtained after building a prototype of the laser apparatus is that changing the current value of each LD causes only a small amount of change affecting the entire fluorescence distribution when one or a few laser rods are excited using a few tens to a few hundred LD's. On the other hand, the mechanism for controlling the drive current for each LD does not function effectively since time fluctuation and thermal fluctuation of the current value supplied from the power source to each LD, ripple, and a fluctuation amount of fluorescence affected by detection fluctuation of a detector or noise are larger.

Moreover, a problem caused when all LD's are driven by one power source is that all LD's are broken simultaneously in a same manner if an excessive current exceeding an allowable range of the LD flows by a defective part in the power source, malfunction of a control system, an operation error by an operator, and an external factor such as thunderbolt and power out.

SUMMARY OF THE INVENTION

The primary object of the present invention is to provide a laser apparatus capable of grasping the degree of LD degradation constantly and accurately in an LD-pumped solid-state laser apparatus. Particularly, the object of the present invention is to provide a highly reliable laser apparatus capable of grasping and detecting the degree of LD degradation and the position of degradation accurately and with a simple configuration in the solid-state laser apparatus that mounts a large number of LD's from a few tens to a few hundred pieces.

Further, another object of the present invention is to provide a simple method of correcting and adjusting the degree of excitation to the solid-state laser medium in accordance with the degree of a degraded LD.

According to the present invention, there is provided a solid-state laser apparatus that has a solid-state laser medium, which absorbs a pumping light to generate or amplify beam of a predetermined wavelength, and a laser diode light source, which generates the pumping light and introduces the generated pumping light into the laser medium directly or via an optical device. The apparatus includes fluorescence detection unit for detecting a quantity of fluorescence generated from the solid-state laser medium at a position inside a laser resonator composing the solid-state laser apparatus, the position being near an optical axis of a laser oscillation light generated in the resonator and not blocking the optical axis. The fluorescence detection unit can be composed of optical unit disposed in a position near the optical axis of the laser oscillation light and not blocking the optical axis and a photo-detector that detects the fluorescence introduced by the optical unit.

Detection of LD degradation in the present invention is performed by measuring not the laser oscillation light but the light quantity of the fluorescence emitted from the laser medium. Since the fluorescence quantity is proportional to the pumping light quantity absorbed in the laser medium, it includes effect and information of changes of an absorption quantity due to changes of wavelength. Particularly in the case of the LD, unlike the case of the lamp, it is possible to know the status of excitation and wavelength change caused by the LD degradation more accurately than simply measuring the pumping light quantity emitted from the LD since the wavelength changes greatly by an operation temperature.

Additionally, the light quantity of fluorescence is not affected by the alignment slippage, stain and the like of the resonator mirror at all. Although the light quantity reduces due to the alternation and damage of the laser medium itself, the stain of its coating film or the like, the degree of reduction is far smaller than the changes of the laser oscillation light. This is because the fluorescence is emitted from the entire laser medium on which the pumping light is irradiated and is harder to be affected by local changes than the laser oscillation light.

However, unlike the laser beam, since the fluorescence has weak directivity and spreads quickly for dissipation as it propagates after generation, it is desirable to detect the fluorescence at a position as close to the laser medium as possible. Although the outside periphery of the solid-state laser medium is normally covered with metal or the like so as to block the fluorescence, the laser medium is optically exposed near the optical axis of the laser oscillation light, where the fluorescence can be observed without fail. However, it is desirable to measure the fluorescence in the laser resonator because the fluorescence is also reflected by the resonator mirror outside the resonator even in the vicinity of the optical axis.

Herein, in the case of measuring the fluorescence quantity in the resonator, laser oscillation itself is inhibited if a photo-detector for measurement, the optical unit for guiding the fluorescence into the unit, or the photo-detector itself blocks the optical axis of the laser oscillation light. Accordingly, they need to be positioned as close to the optical axis as possible so as not to block it in order to constantly detect the fluorescence quantity in the operation state.

The findings that the inventor has obtained from experiments regarding the pumping distribution of the pumping light in the laser medium after building a prototype of the laser apparatus is as follows. Once a mechanical positional configuration between the LD and the laser medium is determined, a fluorescence quantity or a relative value thereof may only be detected, and there is no need to detect the pumping distribution itself by the CCD camera. Furthermore, excitation efficiency is made clear when the fluorescence quantity is measured, and it has made clear that the status of pumping distribution is kept under a constant state if the efficiency value is constant. Therefore, the fluorescence quantity needs not to be detected on the optical axis of the laser beam, but may be detected at a remote position not blocking the optical axis of the laser beam taking advantage of its property of spreading wider than the laser beam. Further, since measuring constantly the fluorescence at the same position maintains the ratio to the entire fluorescence quantity at a constant level, it is possible to accurately know the status of the entire excitation.

The present invention can have a configuration that the pumping light is introduced from a direction approximately perpendicular to the optical axis of the laser oscillation light.

When the pumping light from a larger number of LD's is irradiated on the solid-state laser medium, a method called a so-called side pumping is effective, in which the optical axis of the pumping light is arranged perpendicular to the optical axis of the laser oscillation light in the solid-state laser medium and along the optical axis of the oscillation light. In the present invention, measurement can be performed without depending on the positional relation between the LD and the solid-state laser medium or a pumping method, because the pumping light from the LD is not directly measured but the fluorescence quantity from the solid-state laser medium is measured. The measurement method can be applied to the case where the optical axis of the pumping light is set perpendicular to the optical axis of the laser oscillation light in the solid-state laser medium.

Further, the present invention can have a configuration that the optical unit includes a mirror for reflecting the fluorescence emitted from the solid-state laser medium and the fluorescence reflected by the mirror propagates in space and is made incident into the photo-detector disposed in a predetermined position.

When the photo-detector is directly adjacent to a laser oscillation optical path in the laser resonator, there are cases where it cannot be made closer due to the shape and the size of the photo-detector or an installation position is limited. Then, the photo-detector is installed in a remote position from the optical axis of the laser oscillation light, the fluorescence from the laser medium is irradiated on the optical axis of the laser oscillation light, and unit for reflecting the irradiated fluorescence toward the photo-detector is provided. Thus, the fluorescence can be detected without directly positioning the photo-detector adjacent to the laser oscillation optical path.

Furthermore, the present invention can have a configuration that the optical unit includes a transparent medium in the wavelength of the fluorescence, and the fluorescence made incident from one end of the medium propagates through the medium and is made incident into the photo-detector disposed at the other end.

Because of the weak directivity of the fluorescence, the fluorescence spreads quickly when it is propagated in space to the photo-detector installed at a remote position from the laser oscillation optical path, and there are cases where sufficient light quantity for detection cannot be obtained. Accordingly, the present invention is the one, in which the transparent medium is used in the wavelength of the fluorescence, a portion of the medium is made adjacent to the laser oscillation optical path and the photo-detector is disposed such that another portion of the medium receives the fluorescence propagated through the medium. Thus, the fluorescence is confined within the medium when propagating, and does not spread nor dissipate considerably until it reaches the photo-detector. At this point, a portion of the medium that is made closer to the laser oscillation optical path is processed thin or finely so that it can be easily inserted in or adjacent to the laser optical axis in a narrow laser resonator. Furthermore, the surface shape of the medium, which is made closer to the laser oscillation optical path, may be processed or coating having a predetermined reflectivity may be applied to the surface such that the fluorescence is efficiently introduced in the medium and efficiently propagated to the photo-detector.

Furthermore, the present invention can also have a configuration that the optical unit is formed so as to surround the periphery of the optical axis in a part of the optical path of the laser oscillation light, and the fluorescence made incident from an end portion of an opening provided in the optical unit is guided into the photo-detector disposed in a predetermined position on an end portion of an outer periphery. The transparent medium is disposed in the wavelength of the fluorescence so as to surround the periphery of the optical axis, and thus even weak fluorescence can be effectively collected and taken out for detection.

Still further, the present invention can also have a configuration that the diameter of the opening is set smaller than that of the laser medium. Control of the oscillation transverse mode of the laser oscillation light and separation of the return light from outside the resonator can be performed simultaneously with detection of the fluorescence by allowing the medium to surround the periphery of the oscillation optical axis in the laser resonator as close as possible. For example, in Japanese Patent Laid-Open (unexamined) No. 10-253116, a circular aperture of a non-absorption type, which is disposed on a laser optical path to separate a main beam from a stray light component, is described. The fluorescence propagating through the aperture also can be detected by disposing the photo-detector adjacent to the external side of the aperture.

Further, in the present invention, it is desirable that the transparent medium is made up of glass as parent material. When glass is the parent material, it is inexpensive and processing of a shape is easy, and additionally, the fluorescence can be propagated through the medium to the photo-detector without being absorbed.

Furthermore, the present invention can also have a configuration that a filter selectively attenuates light having the wavelength of the pumping light is included on the optical path of the fluorescence reaching the photo-detector.

The pumping light might be simultaneously made incident on a photo-detecting surface for detecting the fluorescence emitted from the solid-state laser medium, depending on an excitation mode. When the laser oscillation optical axis and the optical axis of the pumping light are parallel with each other, a large quantity of the pumping light that has not been absorbed in the laser medium might go outside the laser medium to be made incident on the photo-detecting surface of the photo-detector simultaneously with the fluorescence from the laser medium.

In this case, in the case where the wavelength of the pumping light is changed to go off from the absorption wave length of the laser medium, the light quantity of the pumping light leaking outside increases because the quantity absorbed by the solid-state laser medium reduces despite that the fluorescence quantity from the laser medium reduces. Thus, the overall light quantity reaching the photo-detecting surface of the photo-detector changes greatly due to a total of the both light quantities, and it is detected on an increased quantity in some cases. Accordingly, correct information that the fluorescence has reduced cannot be sent. Therefore, a filter that selectively attenuates the light having the wavelength of the pumping light is included on the optical path where the fluorescence reaches the photo-detecting surface of the photo-detector, by which only the fluorescence can be received selectively.

Furthermore, the present invention can also have a configuration that a filter, which selectively transmits a wavelength of a fluorescence emission line spectrum that is not used in the laser oscillation out of the fluorescence emitted from the solid-state laser medium, is included on the optical path of the fluorescence reaching the photo-detector.

When oscillation of the solid-state laser apparatus begins, not only the fluorescence but also very intense diffused light from the oscillation light is irradiated on the photo-detecting surface of the photo-detector that detects reflected light or waveguide light from a position near the optical axis or the optical axis. Then, when output of the photo-detector saturates or gain of a signal amplifier is reduced to avoid saturation, there are cases where the fluorescence intensity before oscillation cannot be measured accurately. Further, when the oscillation light made incident into the photo-detector is very intense, it might break the photo-detector itself or deteriorates its performance.

Therefore, a filter that transmits only the wavelength of the fluorescence spectrum not used for laser oscillation is included, taking advantage of original divergence of the fluorescence emitted from the solid-state laser medium. Accordingly, the oscillation light does not saturate nor break the photo-detector since the fluorescence quantity made incident into the photo-detector does not increase greatly even if the laser medium oscillates.

Furthermore, the present invention can also have a configuration that the laser diode light source includes: a plurality of laser diode devices; a power source that drives a plurality of the laser diode devices in a predetermined number of groups; and controller for controlling the drive current of the power source, in which the controller adjusts the drive current for each group in accordance with the intensity of the fluorescence detected by the photo-detector.

As described in the foregoing conventional example, when a great number of LD's are simultaneously used for excitation in the solid-state laser apparatus, a few to a few tens of LD's are electrically connected in series and driven as one group generally. However, the LD's are not only driven in groups but an electric circuit is also constituted such that each LD can be individually operated on the power source for each group, and the fluorescence quantity from the solid-state laser medium when driving each LD is individually is measured. Thus, operation status such as output and wavelength of each LD or the LD's in a group can be individually detected and controlled, and a failure LD or a group including the failure LD can be identified.

Still further, only the failure LD and the LD's in the minimum number of groups that include the failure LD are replaced, and thus the laser apparatus can be recovered without replacing other normal LD's and LD's in a group whose LD's are all normal. As a result, replacement and maintenance operation of LD becomes remarkably easy, and parts cost of the LD and the like required in replacement also becomes inexpensive because only the minimum number of LD's are required for replacement.

Moreover, not only when the LD has failure but also when the LD is slightly degraded, each LD or the electric circuit of a group including the LD is driven individually, and a control circuit is provided, which changes the drive current for each LD light source or its group in accordance with the intensity of the fluorescence generated from the solid-state laser medium, which is detected when driving the LD or the circuit. Accordingly, the excitation status for the solid-state laser medium can be recovered to a uniform status or a stable status initially set. Regarding the difference in absorption efficiency of the pumping light, which occurs due to dispersion of individual output and oscillation wavelength that the LD originally has, controlling the drive current based on the fluorescence intensity at the time of excitation of the LD can correct the dispersion within the minimum range for practical use.

Furthermore, there is no need to individually control the drive current for each LD, but one power source drives single LD's up to about twenty pieces in a group and the circuit is not constituted such that each LD in the group can be individually driven. With this configuration, a small and highly reliable power source can be constituted, and failure of LD can be controlled in the minimum level even if an electronic part of the power source has a problem.

Still further, the present invention provides not only the laser-diode-pumped solid-state laser apparatus of the foregoing configuration, but also a diagnostic method of the degradation status of the laser diode light source performed by the laser apparatus.

THE DETAILED DESCRIPTION OF THE PREFERRED EMBODIMENTS

In a preferred embodiment according to the present invention, the laser-diode-pumped solid-state laser apparatus has at least: a laser rod; a laser diode device that generates pumping light; a reflection mirror provided at a position near the laser optical axis in the laser resonator and not blocking the optical axis; optical unit such as an optical waveguide medium; and a photo-detector that detects fluorescence, in which the photo-detector detects the quantity of the fluorescence generated from the solid-state laser medium, and the degradation status of the laser diode light source is constantly diagnosed by comparing the fluorescence quantity with a predetermined value or a previously measured value.

The embodiments of the foregoing present invention will be described in more detail with reference to the drawings.

Figure 1:
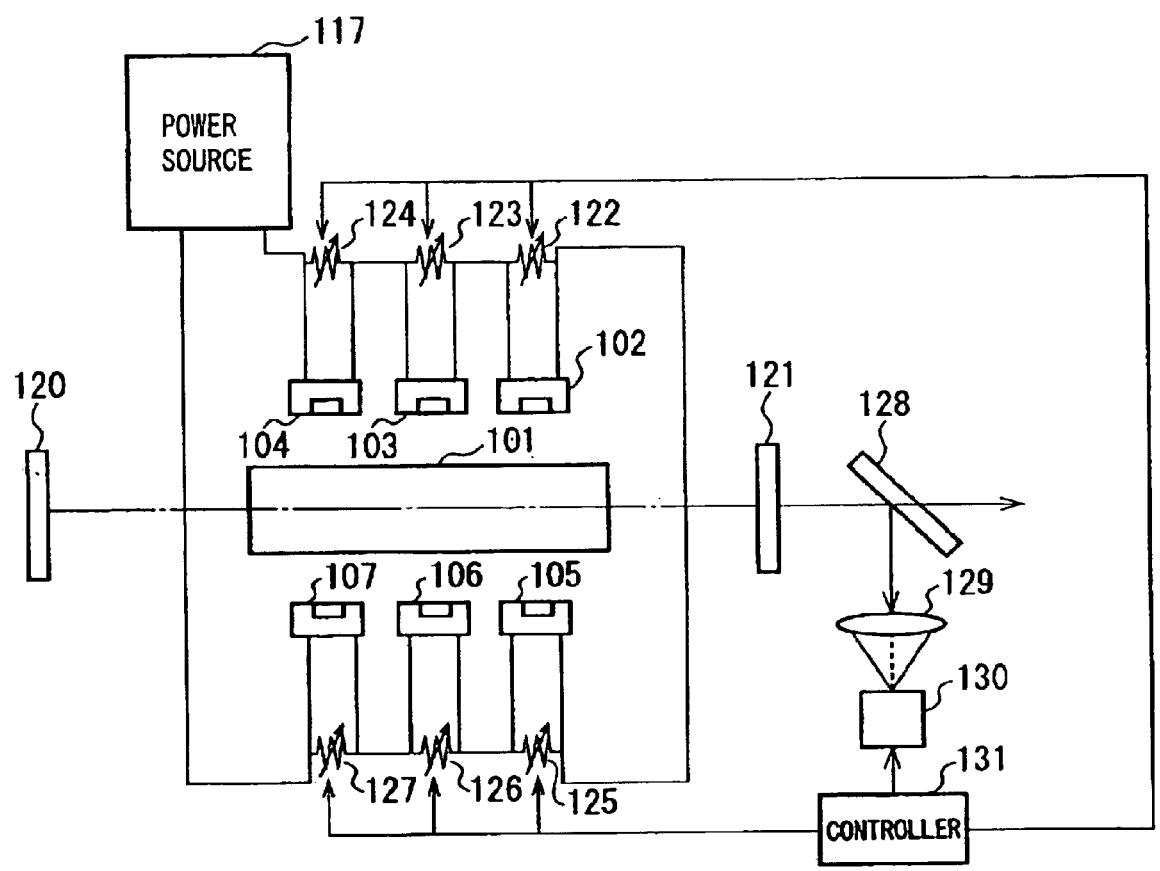
FIG. 1 is a view showing a structure of a conventional LD-pumped solid-state laser apparatus.
Figure 2:
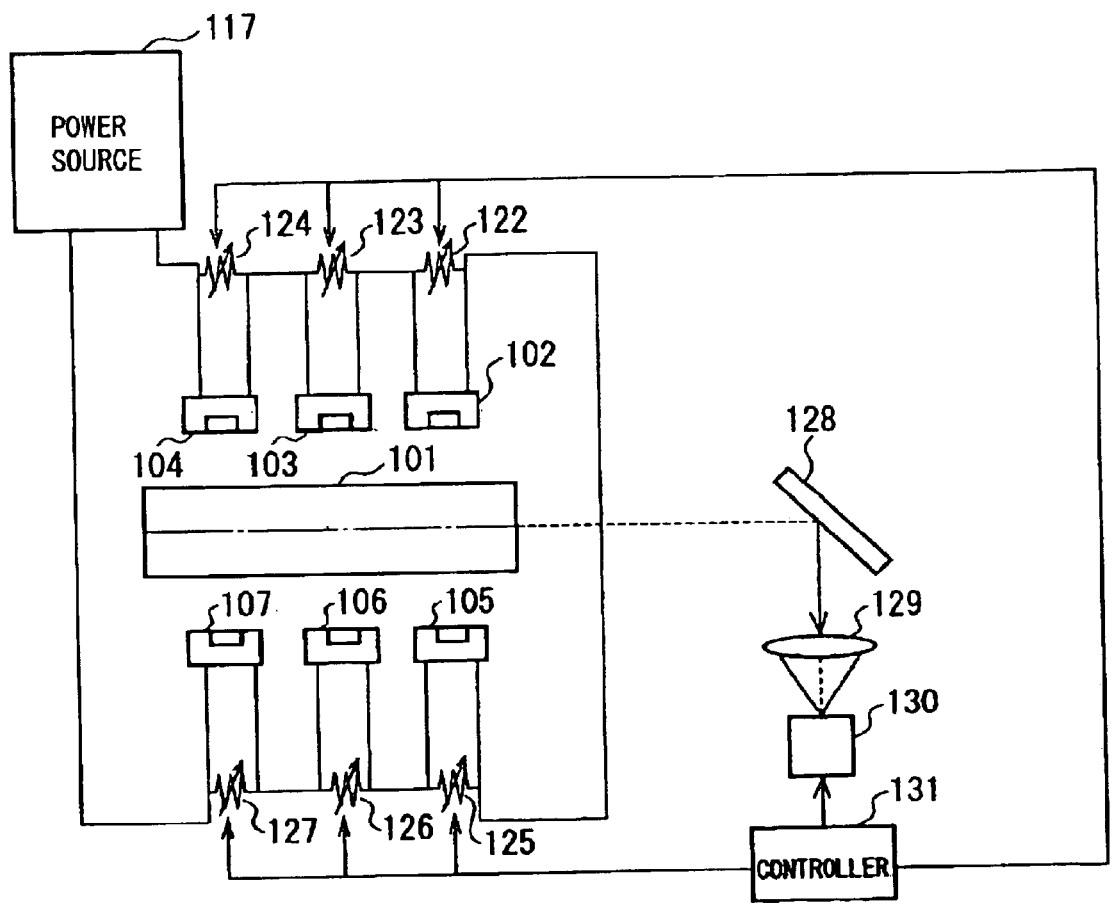
FIG. 2 is a view showing a structure of the conventional LD-pumped solid-state laser apparatus.
Figure 3:
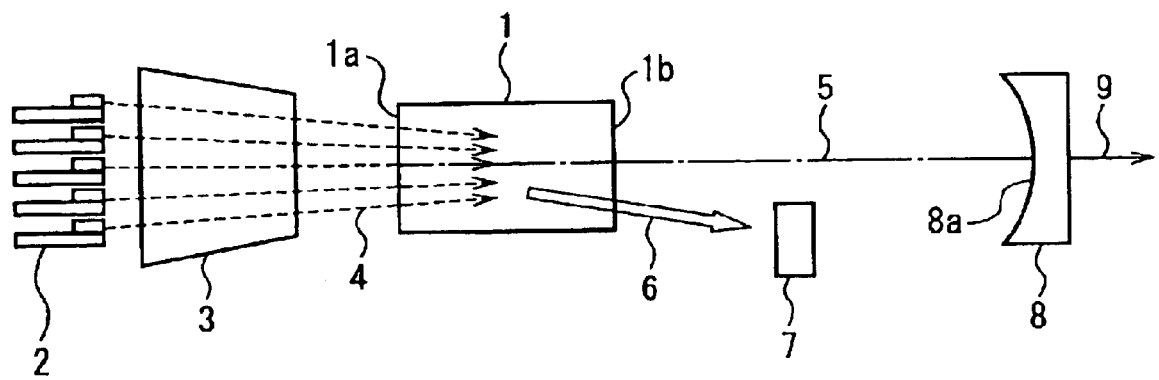
FIG. 3 is a view schematically showing a structure of the LD-pumped solid-state laser apparatus according to a first embodiment of the present invention.

First, description will be made for the laser-diode-pumped solid-state laser apparatus according to the first embodiment of the present invention referring to FIG. 3. FIG. 3 is the view schematically showing the structure of the LD-pumped solid-state laser apparatus according to the first embodiment of the present invention, which shows a cross-section in a direction along the optical axis of the laser oscillation light in the structure of a so-called edge pumping in which the pumping light of LD is irradiated along the laser oscillation optical axis in the laser medium.

As shown in FIG. 3, pumping light 4 (wavelength: 808 nm) emitted from a plurality of laminated laser diode devices 2 (five devices having output of 40 W and emission width of 1 cm are laminated, for example) is irradiated into a laser rod 1 after passing through a focusing optical system 3 and an end surface 1a of the cylindrical shaped Nd:YAG laser rod 1 (Nd concentration: 1.0% at, rod diameter: 3 cm and rod length: 5 cm, for example). A dielectric multi-layer film having the reflectivity of 95% or more for the pumping light wavelength at 808 nm and 0.2% or less for the laser oscillation light wavelength at 1064 nm is formed on an end surface 1b of the laser rod 1, which opposes to the end surface 1a. The pumping light 4 that has not been absorbed in the laser rod 1 is reflected by the end surface 1b to the inside of laser rod 1 again.

In the solid-state laser resonator of this embodiment, an output mirror 8 (radius of curvature of convex surface: 1 m, for example), which is provided opposing to the end surface 1a where the pumping light of the laser rod is made incident, is coated with a reflection film and arranged so as to resonate at its end surface 8a, and thus forming an optical axis 5 of the laser oscillation light. Specifically, a dielectric multi-layer film having the transmittance of 95% or more for the pumping light wavelength at 808 nm and the reflectivity of 99% or more for the laser oscillation wavelength at 1064 nm is formed on the end surface 1a, and a dielectric multi-layer film having the reflectivity of 90% for the laser oscillation wavelength at 1064 nm is formed on the end surface 8a.

On the other hand, a semiconductor photo-detector 7 having Si or the like as the parent material is installed in a position near the optical axis 5 in the resonator and not blocking the optical axis. The pumping light 4 irradiated from the laser diode device 2 is absorbed in the laser rod 1, and fluorescence 6 is generated from the region that has absorbed the light. The fluorescence 6 diffuses in every direction, and a portion of the fluorescence diffuses outside after passing through the end surface 1b, which is closer to the resonator, of the laser rod 1 and reaches the semiconductor photo-detector 7 as shown in FIG. 3.

Since the fluorescence 6 spreads from the region where the light has been absorbed in every direction without directivity, changes of the fluorescence quantity detected by the semiconductor photo-detector 7 is substantially proportional to the total quantity of the fluorescence 6 generated from the entire laser rod 1, that is, the absorption quantity of the pumping light 4, unless the position or the like of the laser rod 1 and the semiconductor photo-detector 7 is changed. The typical cause of reducing the absorption quantity of the pumping light 4 is the reduction in pumping light output due to the degradation of the laser diode device. Another cause of the reduction is changes of wavelength due to a defective cooling mechanism for the laser diode device, and although seldom occurs, stain and failure of the focusing optical system 3, failure of the laser rod 1 or the like.

A specific detection procedure for the degradation of the laser diode device 2 is as follows. The semiconductor photo-detector 7 detects the fluorescence quantity of the laser diode device 2 when it is driven by a particular drive current in the initial state where the device 2 is not degraded, and the detected quantity is recorded. Then, after passing a certain period of time or when necessary, the laser diode device 2 is driven by the same drive current to compare the fluorescence intensity detected with the initial quantity, and thus it is possible to know the degradation status of the laser diode device 2.

It is convenient that the drive current for the laser diode device 2 is selected lower than the drive current value oscillated by the solid-state laser. Although the detection of the fluorescence quantity is possible when the solid-state laser is in oscillation, there are cases where absorption degree of the pumping light cannot be determined only by the fluorescence quantity under the oscillation state of the solid-state laser. This is because pumping light energy absorbed is also consumed as the oscillation light when the solid-state laser oscillates. For example, if the solid-state laser resonator has a fault such as stain on the mirror or slippage of alignment, ratio that the pumping light energy absorbed is converted into the laser beam reduces and the energy is emitted as the fluorescence instead leading to an increase of the fluorescence quantity detected, which does not reflect the status of the pumping light. If the drive current for the laser diode device 2 is selected lower than the drive current value oscillated by the solid-state laser, almost all the energy absorbed in the laser rod 1 is converted into the fluorescence 6. Accordingly, it can be determined that the fluorescence intensity is always proportional to the absorption degree of the pumping light 4.

As described later, in the case where the laser diode devices 2 or groups of the laser diode devices 2 have a plurality of independent power sources or the circuit is constituted so as to drive them independently and the device or the group can be individually driven, or, in the case where the solid-state laser apparatus excited does not oscillate when they are driven individually, the laser diode devices 2 or their group is driven individually and the drive current is set to a particular value to measure the fluorescence intensity, and thus it is possible to know the degradation status of each laser diode device 2 or its group independently.

Figure 4:
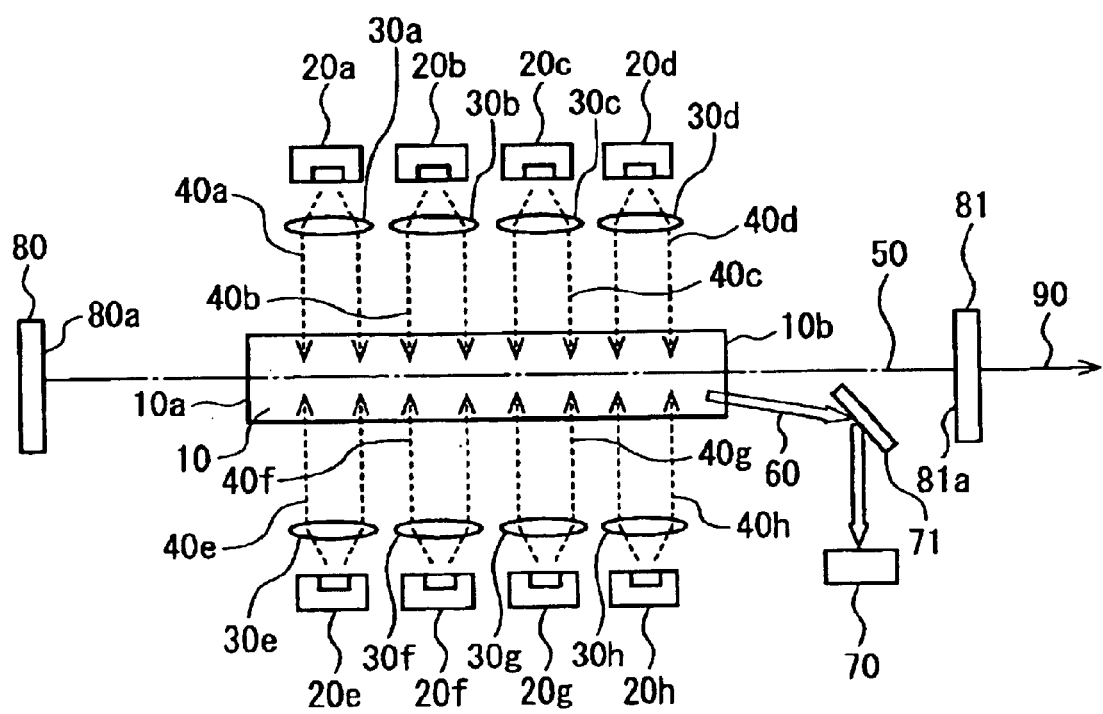
FIG. 4 is a view schematically showing a structure of the LD-pumped solid-state laser apparatus according to a second embodiment of the present invention.
Figure 15A:
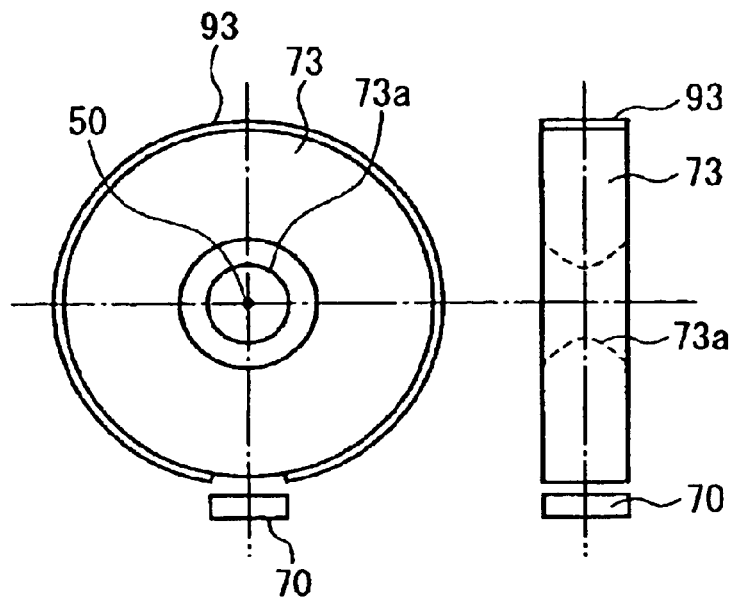
FIGS. 15A, B, C and D are views showing other structures of the LD-pumped solid-state laser apparatus of the present invention, FIGS. 15A, B and C are views showing other structure of an optical waveguide medium.
Figure 15B:
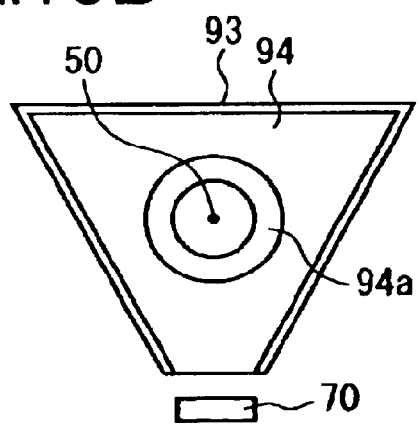
FIG. 15D is a view showing another structure of a reflection mirror.
Figure 15C:
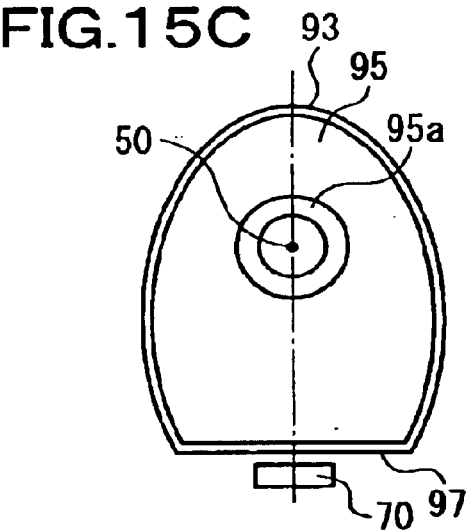
Figure 15D:
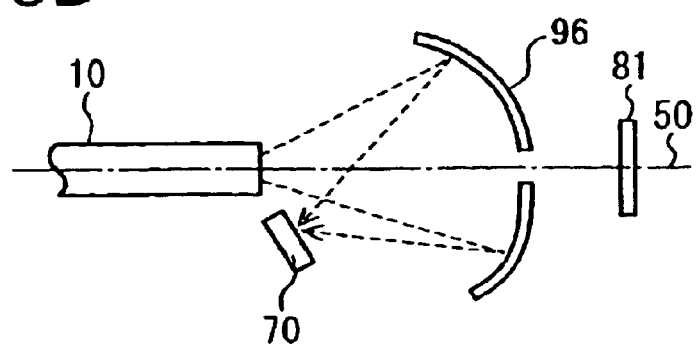

Next, the laser-diode-pumped solid-state laser apparatus according to the second embodiment of the present invention will be described referring to FIGS. 4 and 15D. FIG. 4 is the view schematically showing the structure of the LD-pumped solid-state laser apparatus according to the second embodiment, which shows a cross-section in a direction along the optical axis of the laser oscillation light in the configuration that the pumping light of LD is irradiated along the laser oscillation optical axis of the laser medium. Further, FIG. 15D is the cross-sectional view showing another configuration of the mirror that reflects the fluorescence.

As shown in FIG. 4, a plurality of laser diode devices 20a to 20h (each output of about 40 W) are disposed along the longitudinal direction of an Nd:YAG laser rod 10 (Nd concentration: 0.7% at, rod diameter: 5 cm and rod length: 10 cm, for example), and pumping light 40a to 40h (wavelength: 809 nm) emitted from the devices is shaped through optical systems 30a to 30h and irradiated on the laser rod 10.

The solid-state laser resonator has two resonator mirrors 80, 81, and the dielectric multi-layer film having a particular reflectivity for the oscillation light (wavelength: 1064 nm) of the solid-state laser is formed on their end surfaces 80a, 81a opposing to the laser rod 10. Specifically, a high reflection film having the reflectivity of 99% or more for the wavelength of 1064 nm and a partial reflection film having the reflectivity of 80% are respectively formed on the end surfaces 80a and 81a, for example. The two mirrors 80, 81 and the solid-state laser rod 10 make up the laser oscillation optical axis shown by a reference numeral 50 in the drawing. Furthermore, an anti-reflection film having the reflectivity of 0.2% or less, for example, for the wavelength of 1064 nm is formed on end surfaces 10a, 10b, on which the laser optical axis 50 and the laser rod 10 contact, to prevent the solid-state laser oscillation light from reflecting and diffusing.

A reflection mirror 71 having the reflectivity of 97% for the wavelength of 1064 nm, for example, is disposed in a position near the optical axis 50 in the laser resonator and not blocking the optical axis, whose angle is adjusted so as to reflect fluorescence 60 emitted from the laser rod 10 toward a semiconductor photo-detector 70. Note that a parabolic mirror 96 as shown in FIG. 15D can also be used as the mirror for reflecting the fluorescence 60. In this case, although the size of apparatus is large, it can efficiently focus the fluorescence 60 of a wide range on the semiconductor photo-detector 70, which is suitable for a system that detects the fluorescence 60 in high sensitivity.

Figure 5:
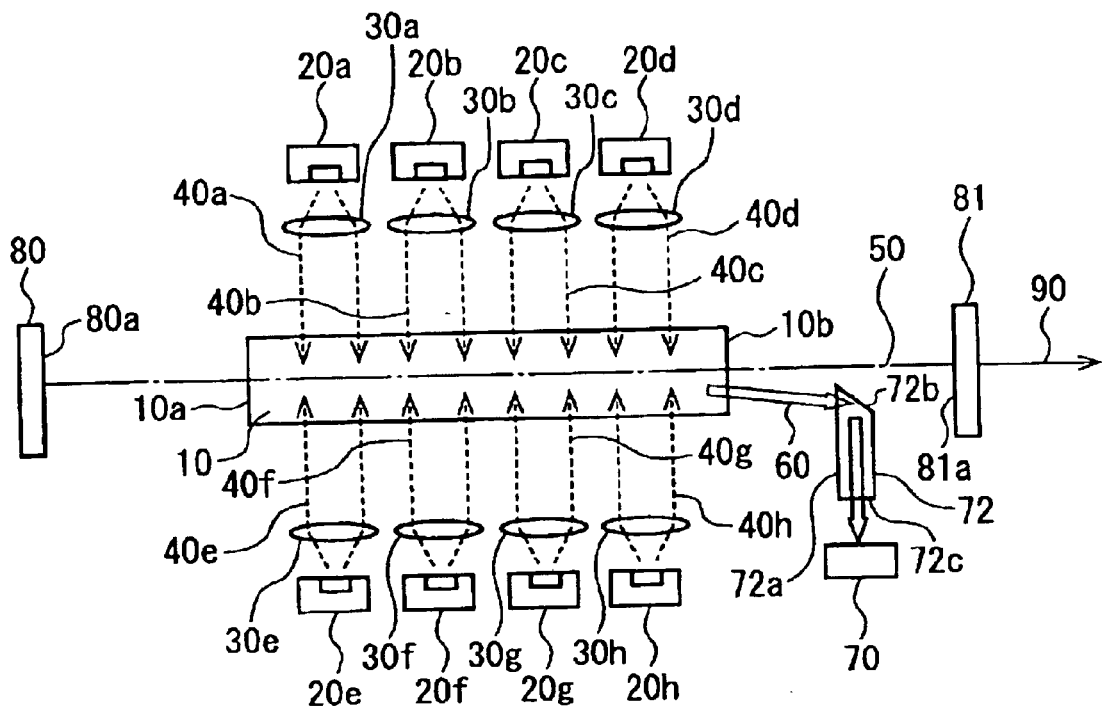
FIG. 5 is a view schematically showing a structure of the LD-pumped solid-state laser apparatus according to a third embodiment of the present invention.

Next, the laser-diode-pumped solid-state laser apparatus according to the third embodiment of the present invention will be described referring to FIG. 5. FIG. 5 is the view schematically showing the structure of the LD-pumped solid-state laser apparatus according to the third embodiment, which shows a cross-section in the direction In along the optical axis of the laser oscillation light in the configuration that the pumping light of LD is irradiated along the laser oscillation optical axis of the laser medium.

As shown in FIG. 5, a plurality of laser diode devices 20a to 20h are disposed along the side and the longitudinal direction of the Nd:YAG laser rod 10 (Nd concentration: 0.7% at, rod diameter: 5 cm and rod length: 10 cm, for example) so as to surround the laser rod 10, and the pumping light 40a to 40h (wavelength: 809 nm) emitted from the devices is shaped through the optical systems 30a to 30h and irradiated on the laser rod 10.

The solid-state laser resonator has two resonator mirrors 80, 81, and the dielectric multi-layer film having the particular reflectivity for the oscillation light (wavelength: 1064 nm) of the solid-state laser is formed on their end surfaces 80a, 81a opposing to the laser rod 10. Specifically, the high reflection film having the reflectivity of 99% or more for the wavelength of 1064 nm and the partial reflection film having the reflectivity of 80% are respectively formed on the end surfaces 80a and 81a, for example. The two mirrors 80, 81 and the solid-state laser rod 10 make up the laser oscillation optical axis shown by the reference numeral 50 in the drawing. Furthermore, the anti-reflection film having the reflectivity of 0.2% or less, for example, for the wavelength of 1064 nm is formed on the end surfaces 10a, 10b, on which the laser optical axis 50 and the laser rod 10 contact, to prevent the solid-state laser oscillation light from reflecting and diffusing.

A transparent medium 72 (quartz glass, for example) for the wavelength of 1064 nm is disposed in a position near the optical axis 50 in the laser resonator and not blocking the optical axis, whose angle is adjusted so as to reflect fluorescence 60 emitted from the laser rod 10 toward a semiconductor photo-detector 70. Specifically, the fluorescence 60 emitted from the laser rod 10 passes through a surface 72a, which opposes to the laser rod 10, of the optical waveguide medium 72, and is reflected by a surface 72b having an angle of about 45 degrees to the rectilinear fluorescence 60. Then, the fluorescence propagates through the optical waveguide medium 72 to be emitted from a surface 72c, and reaches the photo-detecting surface of the semiconductor photo-detector 70 arranged adjacent to the surface 72c.

As described, since detecting the fluorescence 60 via the transparent optical waveguide medium 72 eliminates the need for the photo-detecting surface of the semiconductor photo-detector 70 to directly approach the laser optical path, the semiconductor photo-detector 70 has a high degree of freedom for arrangement. For example, even in the case where the distance between the laser rod 10 and the resonator mirror 81 is narrow and the semiconductor photo-detector 70 is difficult to be inserted, inserting the small medium 72 can efficiently guide the fluorescence 60 into the semiconductor photo-detector 70 for detection.

Figure 6:
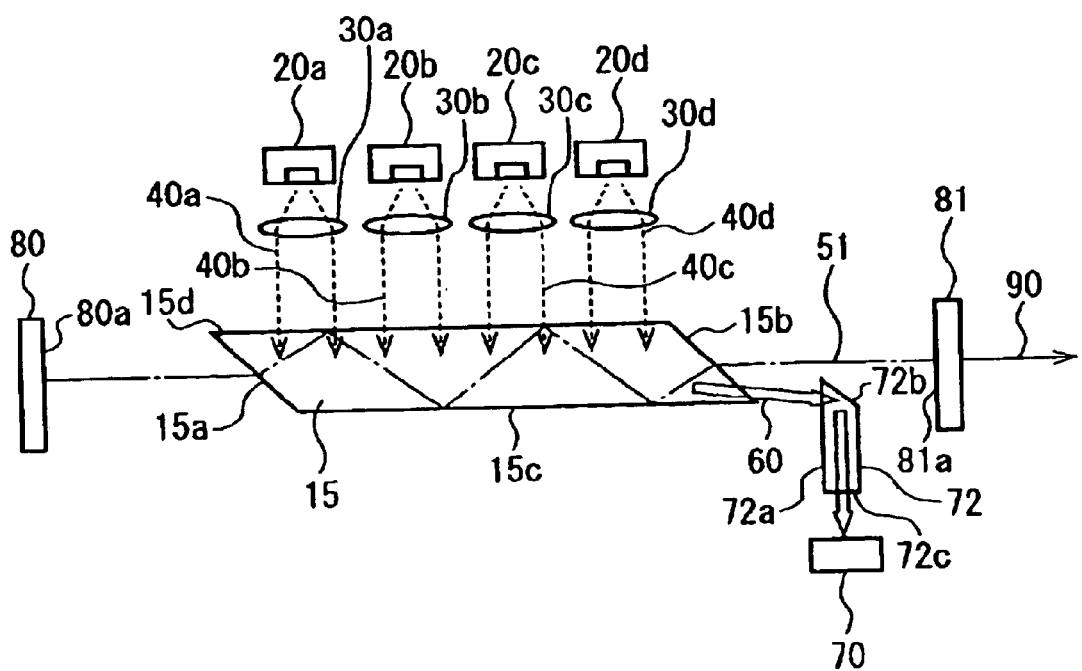
FIG. 6 is a view schematically showing a structure of the LD-pumped solid-state laser apparatus according to a fourth embodiment of the present invention.

Next, the laser-diode-pumped solid-state laser apparatus according to the fourth embodiment of the present invention will be described referring to FIG. 6. FIG. 6 is the view schematically showing the structure of the LD-pumped solid-state laser apparatus according to the fourth embodiment, which shows a cross-section in the direction along the optical axis of the laser oscillation light in the configuration that the pumping light of LD is irradiated along the laser oscillation optical axis of the laser medium.

As shown in FIG. 6, a plurality of laser diode devices 20*a* to 20*d* are disposed along the longitudinal direction of a rhombic Nd:YAG laser slab 15 (Nd concentration: 0.7% at, slab width: 5 cm and slab length: 10 cm, for example), and the pumping light 40*a* to 40*d* (wavelength: 809 nm) emitted from the devices is shaped through the optical systems 30*a* to 30*d* and irradiated on the laser crystal.

The solid-state laser resonator has two resonator mirrors 80, 81, and the dielectric multi-layer film having the particular reflectivity for the oscillation light (wavelength: 1064 nm) of the solid-state laser is formed on their end surfaces 80*a*, 81*a* opposing to the solid-state laser slab 15. Specifically, the high reflection film having the reflectivity of 99% or more for the wavelength of 1064 nm and the partial reflection film having the reflectivity of 80% are respectively formed on the end surfaces 80*a* and 81*a*, for example. The two mirrors 80, 81 and the solid-state laser slab 15 make up a zigzag laser oscillation optical axis 51 shown in the drawing. The laser oscillation light passes through end surfaces 15*a*, 15*b* tilted in the Brewster angle for the optical axis, and travels while totally reflecting on end surface 15*c* in the slab, which is excited by the laser diode devices, and opposing end surface 15*d*.

The transparent medium 72 for the wavelength of 1064 nm is disposed in a position near the optical axis 51 in the laser resonator and not blocking the optical axis, whose angle is adjusted so as to reflect fluorescence 60 emitted from the solid-state laser slab 15 toward the semiconductor photo-detector 70.

Figure 7:
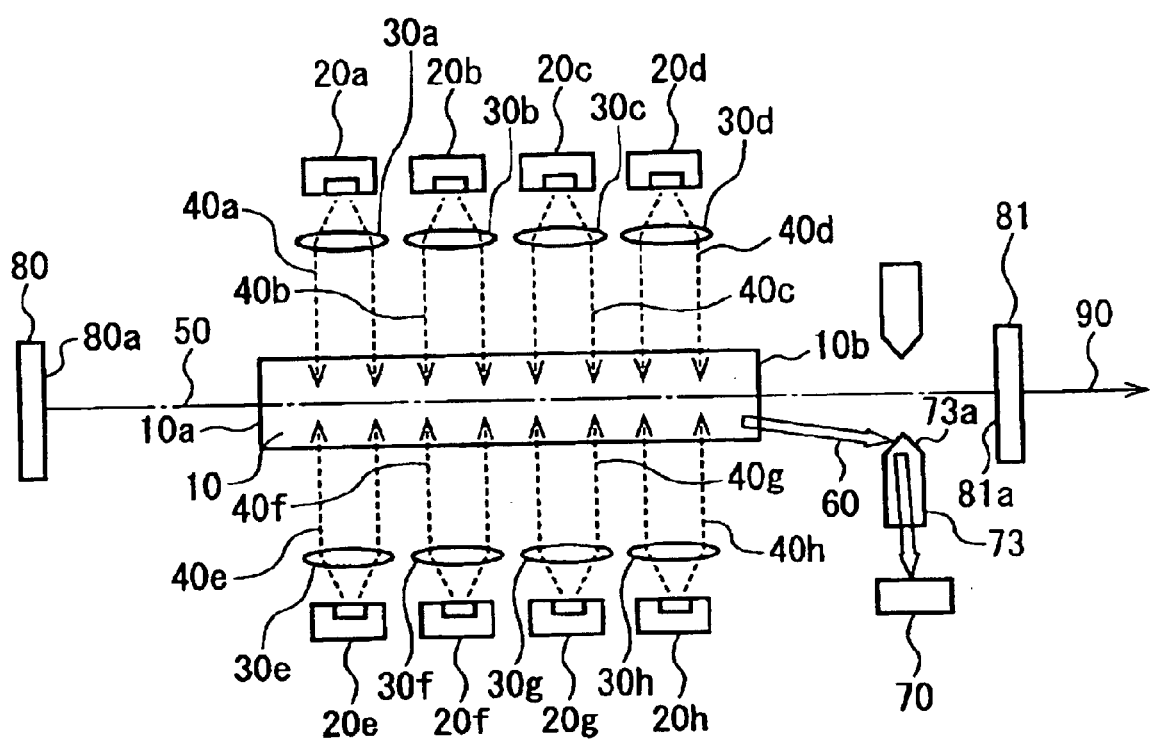
FIG. 7 is a view schematically showing a structure of the LD-pumped solid-state laser apparatus according to a fifth embodiment of the present invention.
Figure 16:
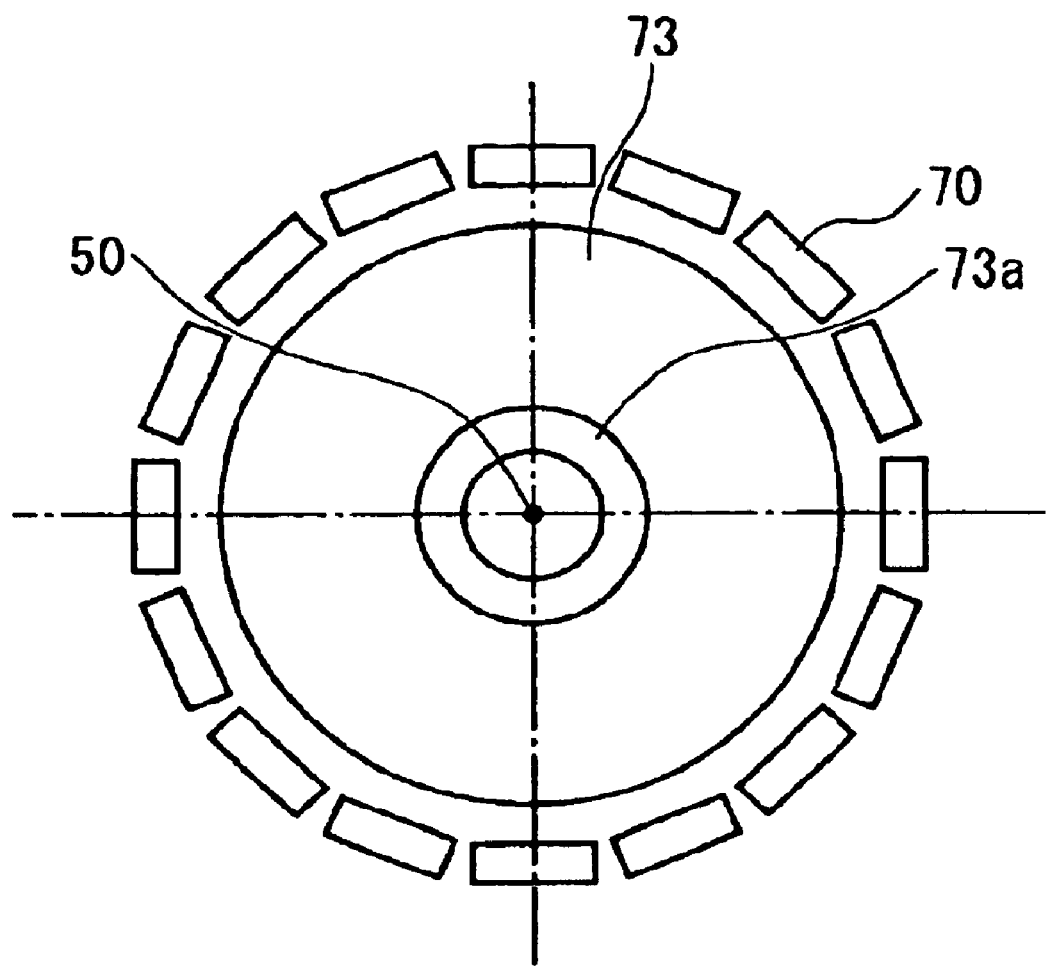
FIG. 16 is a view schematically showing another structure of the LD-pumped solid-state laser apparatus according to the fifth embodiment of the present invention.

Next, the laser-diode-pumped solid-state laser apparatus according to the fifth embodiment of the present invention will be described referring to FIGS. 7, 15A, 15B, 15C and 16. FIG. 7 is the view schematically showing the structure of the LD-pumped solid-state laser apparatus according to the fifth embodiment, which shows a cross-section in the direction along the optical axis of the laser oscillation light in the configuration that the pumping light of LD is irradiated along the laser oscillation optical axis of the laser medium. Further, FIGS. 15A, 15B and 15C are the views schematically showing the detail structure of the optical waveguide medium and its variations, and FIG. 16 is the view schematically showing another structure of the laser-diode-pumped solid-state laser apparatus.

As shown in FIG. 7, a plurality of laser diode devices 20*a* to 20*h* are disposed along the side and the longitudinal direction of the Nd:YAG laser rod 10 (Nd concentration: 0.7% at, rod diameter: 5 cm and rod length: 10 cm, for example) so as to surround the laser rod 10, and the pumping light 40*a* to 40*h* (wavelength: 808 nm) emitted from the devices is shaped through the optical systems 30*a* to 30*h* and irradiated on the laser rod 10.

The solid-state laser resonator has two resonator mirrors 80, 81, and the dielectric multi-layer film having the particular reflectivity for the oscillation light (wavelength: 1064 nm) of the solid-state laser is formed on their end surfaces 80*a*, 81*a* opposing to the laser rod 10. Specifically, the high reflection film having the reflectivity of 99% or more for the wavelength of 1064 nm and the partial reflection film having the reflectivity of 80% are respectively formed on the end surfaces 80*a* and 81*a*, for example. The two mirrors 80, 81 and the solid-state laser rod 10 make up the laser oscillation optical axis shown by the reference numeral 50 in the drawing. Furthermore, the anti-reflection film having the reflectivity of 0.2% or less for the wavelength of 1064 nm is formed on the end surfaces 10*a*, 10*b*, on which the laser optical axis 50 and the laser rod 10 contact, to prevent the solid-state laser oscillation light from reflecting and diffusing.

A transparent medium 73 for the wavelength of 1064 nm is disposed in a position near the optical axis 50 in the laser resonator and not blocking the optical axis. The medium 73 surrounds the periphery of the optical axis 50 to have a rotation symmetrical shape around the optical axis, and the semiconductor photo-detector 70 is adjacent to its outside. A triangular protrusion is formed on a side opposing to the optical axis of the medium 73 as shown in the drawing, the fluorescence 60 emitted from the laser rod 10 is introduced into the medium 73 through its surface 73*a*, propagates to the outside while reflecting inside the medium, and finally reaches the photo-detecting surface of the semiconductor photo-detector 70.

More specifically, the optical waveguide medium 73 is formed in a disc shape having an opening at the central portion through which a laser beam 90 passes, as shown in FIG. 15(A). The fluorescence incident end surface 73*a* having a predetermined tilt angle is provided near the opening, and a total reflection film 93 made up of metal, the dielectric film or the like is provided in the region of the outer periphery other than the one facing the semiconductor photo-detector 70. The fluorescence 60 made incident from the end surface 73*a* radially propagates toward the outer periphery of the medium 73, is reflected by the total reflection film 93 on the outer periphery, and is finally made incident into the semiconductor photo-detector 70.

Note that the shape of the optical waveguide medium is not limited to the disc shape, but may be a polygonal shape, an elliptic shape or the like. For example, in the case of a trapezoidal shape shown in FIG. 15B, the fluorescence 60 made incident from a fluorescence incident end surface 94*a* propagates toward the outer periphery of the optical waveguide medium 93, reflects on the total reflection film 93 provided on the outer periphery other than a side for which the semiconductor photo-detector 70 is arranged, and is finally made incident into the semiconductor photo-detector 70. Furthermore, in the case of the elliptic shape shown in FIG. 15C, the center of opening portion of an optical waveguide medium 95 and the laser optical axis 50 are arranged on the first focal point of the ellipse and the semiconductor photo-detector 70 is arranged on the second focal point, and thus all the fluorescence 60 reflected by the total reflection film 93 can be detected by the semiconductor photo-detector 70. Still further, in the foregoing structure, a non-reflection film 97 is provided on the surface of the optical waveguide medium, which opposes to the semiconductor photo-detector 70, and thus the reflection of the fluorescence 60 can be restricted and the fluorescence 60 can be efficiently guided into the semiconductor photo-detector 70.

As described, arranging the transparent medium 73 so as to surround the periphery of the optical axis increases the quantity of the fluorescence 60 that can be guided into the medium 73, which can increase the quantity of the fluorescence 60 reaching the photo-detecting surface of the semiconductor photo-detector 70. And, since there is no need to make the photo-detecting surface of the semiconductor photo-detector 70 directly approach the laser optical path, the semiconductor photo-detector 70 has a high degree of freedom for arrangement. For example, even in the case where the distance between the laser rod 10 and the resonator mirror 81 is narrow and the semiconductor photo-detector 70 is difficult to be inserted, inserting the thin medium 73 can efficiently guide the fluorescence 60 into the semiconductor photo-detector 70 for detection.

Note that a plurality of the semiconductor photo-detectors 70 may be arranged so as to surround the periphery of the disc-shaped medium 73 as shown in FIG. 16. By comparing the output from a plurality of the semiconductor photo-detectors 70, the axial symmetry of the laser emission can be determined and the detail position of degradation can be identified as well.

Figure 8:
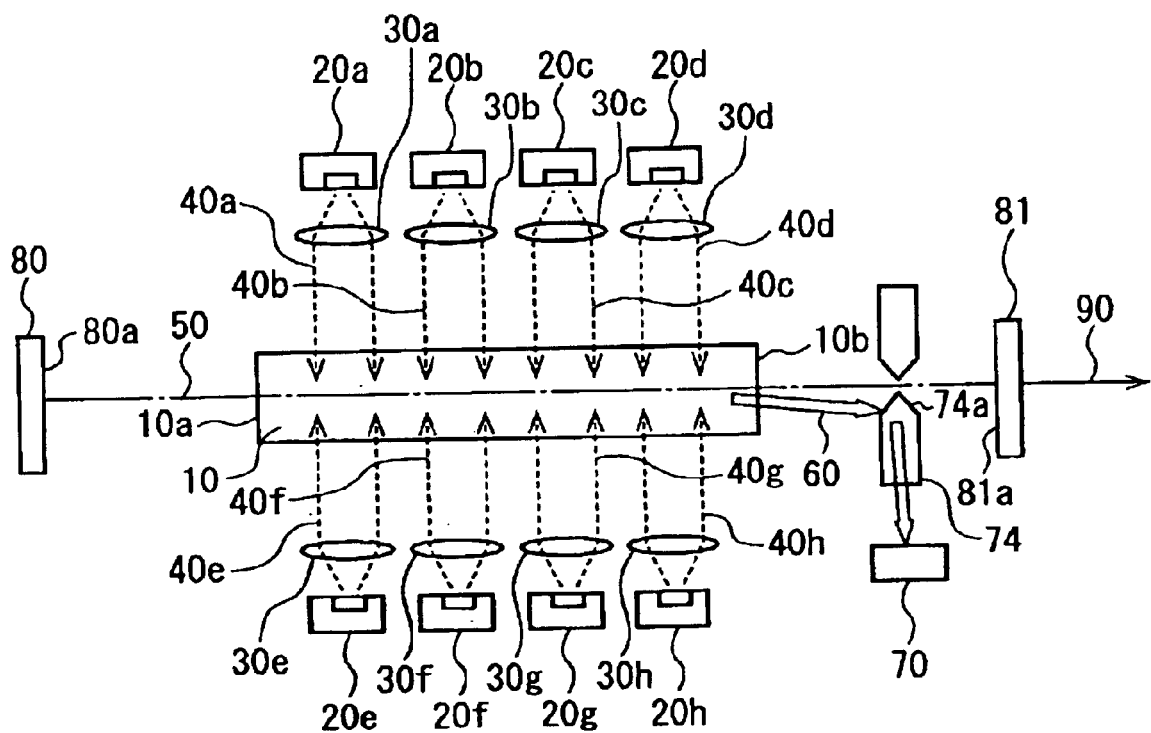
FIG. 8 is a view schematically showing a structure of the LD-pumped solid-state laser apparatus according to a sixth embodiment of the present invention.

Next, the laser-diode-pumped solid-state laser apparatus according to the sixth embodiment of the present invention will be described referring to FIG. 8. FIG. 8 is the view schematically showing the structure of the LD-pumped solid-state laser apparatus according to the sixth embodiment, which shows a cross-section in the direction along the optical axis of the laser oscillation light in the configuration that the pumping light of LD is irradiated along the laser oscillation optical axis of the laser medium.

As shown in FIG. 8, a plurality of laser diode devices 20*a* to 20*h* are disposed along the side and the longitudinal direction of the Nd:YAG laser rod 10 (Nd concentration: 0.7% at, rod diameter: 5 cm and rod length: 10 cm, for example) so as to surround the laser rod 10, and the pumping light 40*a* to 40*h* (wavelength: 808 nm) emitted from the devices is shaped through the optical systems 30*a* to 30*h* and irradiated on the laser rod 10.

The solid-state laser resonator has two resonator mirrors 80, 81, and the dielectric multi-layer film having the particular reflectivity for the oscillation light (wavelength: 1064 nm) of the solid-state laser is formed on their end surfaces 80*a*, 81*a* opposing to the laser rod 10. Specifically, the high reflection film having the reflectivity of 99% or more for the wavelength of 1064 nm and the partial reflection film having the reflectivity of 80% are respectively formed on the end surfaces 80*a* and 81*a*, for example. The two mirrors 80, 81 and the solid-state laser rod 10 make up the laser oscillation optical axis shown by the reference numeral 50 in the drawing. Furthermore, the anti-reflection film having the reflectivity of 0.2% or less, for example, for the wavelength of 1064 nm is formed on the end surfaces 10*a*, 10*b*, on which the laser optical axis 50 and the laser rod 10 contact, to prevent the solid-state laser oscillation light from reflecting and diffusing.

A transparent medium 74 for the wavelength of 1064 nm is disposed in a position near the optical axis 50 in the laser resonator and not blocking the optical axis. The medium 74 surrounds the periphery of the optical axis 50 to have the rotation symmetrical shape around the optical axis, and the semiconductor photo-detector 70 is adjacent to its outside. The triangular protrusion is formed on a side opposing to the optical axis of the medium 74 as shown in the drawing, the fluorescence 60 emitted from the laser rod 10 propagates into the medium 74 through its surface 74*a* while being diffracted or reflected, and finally reaches the photo-detecting surface of the semiconductor photo-detector 70.

As described, arranging the transparent medium 74 so as to surround the periphery of the optical axis increases the quantity of the fluorescence 60 that can be guided into the medium 74, which can increase the quantity of the fluorescence 60 reaching the photo-detecting surface of the semiconductor photo-detector 70. And, since there is no need to make the photo-detecting surface of the semiconductor photo-detector 70 directly approach the laser optical path, the semiconductor photo-detector 70 has a high degree of freedom for arrangement. For example, even in the case where the distance between the laser rod 10 and the resonator mirror 81 is narrow and the semiconductor photo-detector 70 is difficult to be inserted, inserting the thin medium 74 can detect the fluorescence 60.

Moreover, the hole diameter of the medium 74 through which the optical axis passes is about 3.5 mm, which is set smaller than the outer diameter (5 mm) of the laser rod 10. For this reason, poor beam quality component having a wide beam divergent angle or a large beam diameter suffers a great optical loss during the laser oscillation when passing through the medium 74, and the oscillation is inhibited. Consequently, the quality of the laser beam 90 emitted from the mirror 81 can be improved. Improvement of the laser beam quality can be achieved simultaneously with the detection of the fluorescence intensity.

Figure 9:
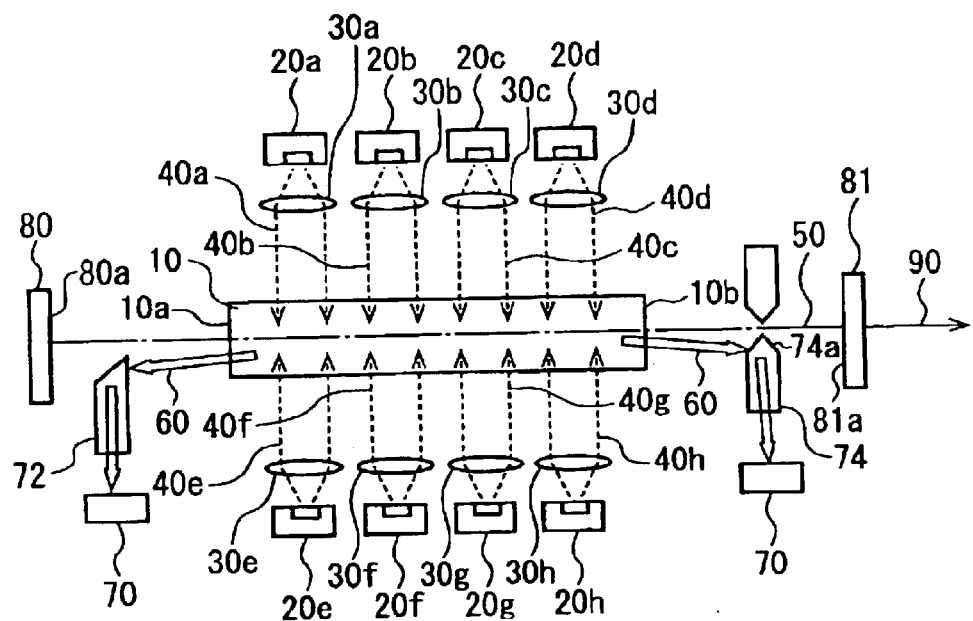
FIG. 9 is a view schematically showing a structure of the LD-pumped solid-state laser apparatus according to a seventh embodiment of the present invention.

Next, the laser-diode-pumped solid-state laser apparatus according to the seventh embodiment of the present invention will be described referring to FIG. 9. FIG. 9 is the view schematically showing the structure of the LD-pumped solid-state laser apparatus according to the seventh embodiment, which shows a cross-section in the direction along the optical axis of the laser oscillation light in the configuration that the pumping light of LD is irradiated along the laser oscillation optical axis of the laser medium.

As shown in FIG. 9, a plurality of laser diode devices 20*a* to 20*h* are disposed along the side and the longitudinal direction of the Nd:YAG laser rod 10 (Nd concentration: 0.7% at, rod diameter: 5 cm and rod length: 10 cm, for example) so as to surround the laser rod 10, and the pumping light 40*a* to 40*h* (wavelength: 808 nm) emitted from the devices is shaped through the optical systems 30*a* to 30*h* and irradiated on the laser rod 10.

The solid-state laser resonator has two resonator mirrors 80, 81, and the dielectric multi-layer film having the particular reflectivity for the oscillation light (wavelength: 1064 nm) of the solid-state laser is formed on their end surfaces 80*a*, 81*a* opposing to the laser rod 10. Specifically, the high reflection film having the reflectivity of 99% or more for the wavelength of 1064 nm and the partial reflection film having the reflectivity of 80% are respectively formed on the end surfaces 80*a* and 81*a*, for example. The two mirrors 80, 81 and the solid-state laser rod 10 make up the laser oscillation optical axis shown by the reference numeral 50 in the drawing. Furthermore, the anti-reflection film having the reflectivity of 0.2% or less, for example, for the wavelength of 1064 nm is formed on the end surfaces 10*a*, 10*b*, on which the laser optical axis 50 and the laser rod 10 contact, to prevent the solid-state laser oscillation light from reflecting and diffusing.

The transparent media 72, 74 for the wavelength of 1064 nm are disposed in a position near the optical axis 50 in the laser resonator and not blocking the optical axis, and respectively adjacent to the mirrors 80, 81. The medium 72 is arranged to propagate fluorescence 60a emitted from the end surface 10a of the laser rod 10 in the medium and guide it into the adjacent photo-detector 70a. On the other hand, the medium 74 surrounds the periphery of the optical axis 50 to have the rotation symmetrical shape around the optical axis, and a semiconductor photo-detector 70b is adjacent to its outside. The triangular protrusion is formed on a side opposing to the optical axis of the medium 74 as shown in the drawing, the fluorescence 60b emitted from the laser rod 10 propagates into the medium 74 through its surface while being diffracted or reflected, and finally reaches the photo-detecting surface of the semiconductor photo-detector 70b.

When the laser rod 10 is long and the number of laser diode device arrays is increased, fluorescence of the LD or the excitation region of the laser rod, which is farther from the semiconductor photo-detector, diffuses due to little directivity. However, by arranging the semiconductor photo-detectors on both end surfaces sandwiching the laser rod 10, it is possible to know more accurately the information of the laser diode device or the excitation region far from either semiconductor photo-detector.

Figure 10:
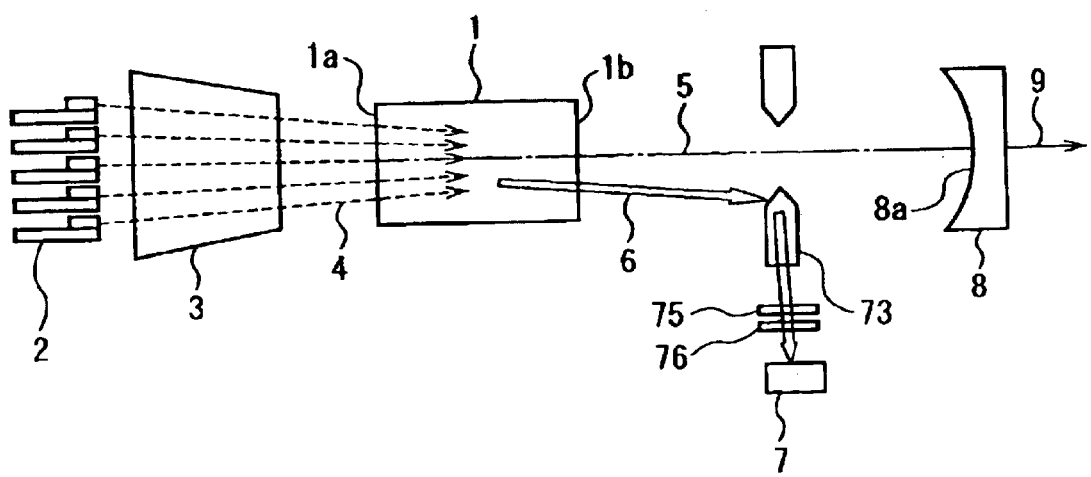
FIG. 10 is a view schematically showing a structure of the LD-pumped solid-state laser apparatus according to an eighth embodiment of the present invention.
Figure 11:
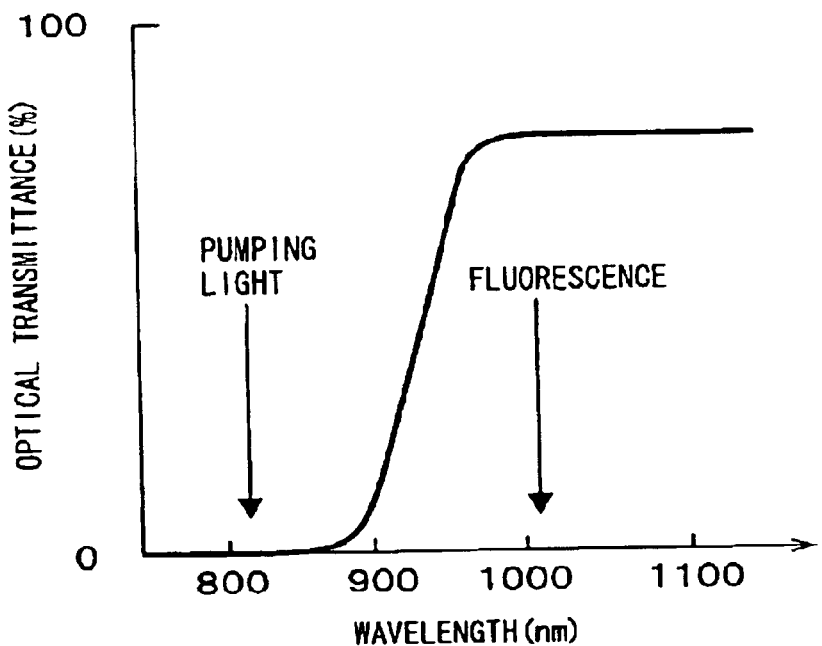
FIG. 11 is a graph showing characteristic of a filter blocking the wavelength of the pumping light.
Figure 12:
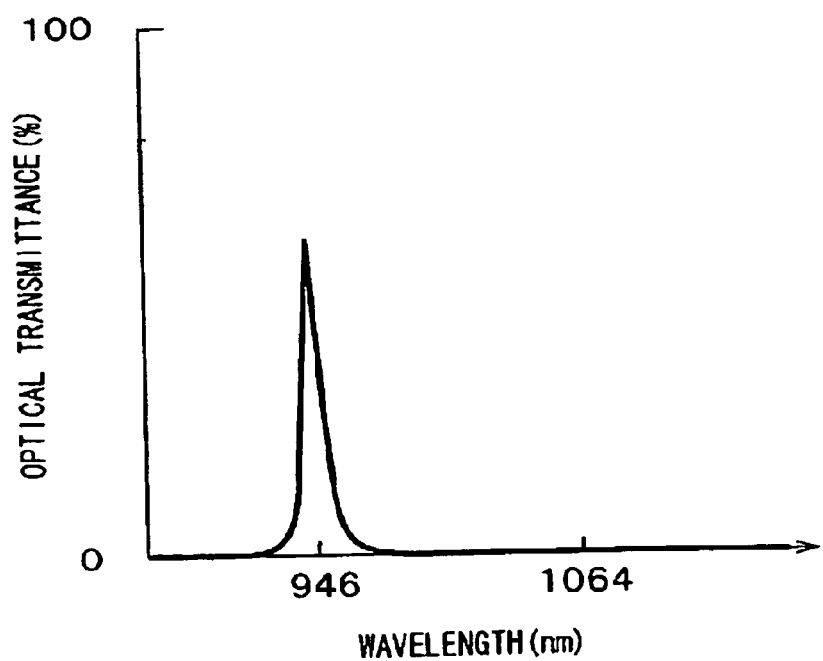
FIG. 12 is a graph showing characteristic of a filter transmitting only a wavelength of an emission line spectrum that is not used in laser oscillation.

Next, the laser-diode-pumped solid-state laser apparatus according to the eighth embodiment of the present invention will be described referring to FIGS. 10, 11 and 12. FIG. 10 is the view schematically showing the structure of the LD-pumped solid-state laser apparatus according to the eighth embodiment, which shows a cross-section in the direction along the optical axis of the laser oscillation light in the configuration that the pumping light of LD is irradiated along the laser oscillation optical axis of the laser medium. And, FIG. 11 is the view showing the transmittance characteristic of a pumping light blocking filter, and FIG. 12 is the view showing the transmittance characteristic of a narrow-band transmittance filter that takes out only wavelength component making no contribution to oscillation.

As shown in FIG. 10, the pumping light 4 (wavelength: 808 nm) emitted from the laser diode devices 2 laminated in plural numbers (five devices having output of 40 W and an emission width of 1 cm are laminated, for example) is irradiated into the laser rod 1 after passing through the focusing optical system 3 and the end surface 1a of the cylindrical shaped Nd:YAG laser rod 1 (Nd concentration: 0.8% at, rod diameter: 3 cm and rod length: 5 cm, for example).

The dielectric multi-layer film having the reflectivity of 95% or more for the pumping light wavelength of 808 nm and the reflectivity of 0.2% or less for the laser oscillation light wavelength of 1064 nm, for example, is formed on the end surface 1b of the laser rod 1, which opposes to the end surface 1a. The pumping light that has not been absorbed in the laser rod 1 is reflected by the end surface 1b to the inside of laser rod 1 again.

In the solid-state laser resonator of this embodiment, the output mirror 8, which is provided opposing to the end surface 1a where the pumping light 4 of the laser rod 1 is made incident, is coated with the reflection film and arranged so as to resonate at the end surface 8a, which forms the optical axis 5 of the laser oscillation light. Specifically, the dielectric multi-layer film having the transmittance of 95% or more for the pumping light wavelength at 808 nm and the reflectivity of 99% or more for the laser oscillation light wavelength at 1064 nm is formed on the end surface 1a. Similarly, the dielectric multi-layer film having the reflectivity of 90% for the laser oscillation wavelength at 1064 nm is formed on the end surface 8a.

The transparent medium 73 for the wavelength of 1064 nm is disposed in a position near the optical axis 5 in the laser resonator and not blocking the optical axis. The medium 73 surrounds the periphery of the optical axis 5 to have the rotation symmetrical shape around the optical axis, and a semiconductor photo-detector 7 is adjacent to its outside. The triangular protrusion is formed on the side opposing to the optical axis of the medium 73 as shown in the drawing, the fluorescence 6 emitted from the laser rod 1 propagates into the medium 73 through its surface while being diffracted or reflected, and finally reaches the photo-detecting surface of the semiconductor photo-detector 7.

As described, arranging the transparent medium 73 so as to surround the periphery of the optical axis 5 increases the quantity of the fluorescence 6 that can be guided into the medium 73, which can increase the quantity of the fluorescence 6 reaching the photo-detecting surface of the semiconductor photo-detector 7. And, since there is no need to make the photo-detecting surface of the semiconductor photo-detector 7 directly approach the laser optical path, the semiconductor photo-detector 7 has a high degree of freedom for arrangement. For example, even in the case where the distance between the laser rod 1 and the resonator mirror 8 is narrow and the semiconductor photo-detector 7 is difficult to be inserted, inserting the thin medium 73 can detect the fluorescence 6.

Moreover, a pumping light blocking filter (HOYA RM100, for example) 75, which absorbs the wavelength of the pumping light 4 and transmits only the fluorescence 6 emitted from the laser rod 1, and a narrow-band transmittance filter (interference filter) 76, which transmits only wavelength component making no contribution to oscillation out of the fluorescence 6, are inserted between the side of the medium 73 and the semiconductor photo-detector 7, and only light out of the fluorescence 6, which has the wavelength making no contribution to oscillation, reaches the semiconductor photo-detector 7 for detection. As described, including the two filters in the apparatus can accurately and reliably measure not the pumping light itself but the quantity of fluorescence generated by absorbing the pumping light.

FIG. 11 is the view showing an example of the transmittance characteristic of the pumping light blocking filter 75 that cuts off the pumping light and transmits only the fluorescence. As it is clear from the drawing, the transmittance near the pumping light wavelength at 808 nm is as low as less than 5%, and on the contrary, is high near the fluorescence wavelength at 1064 nm. A filter having such characteristic is R85 or RM100 manufactured by Hoya Corporation. Further, not only an absorption type filter but also a dielectric multi-layer film having the same transmittance can be used.

FIG. 12 is the view showing an example of the transmittance characteristic of the narrow-band transmittance filter 76 that takes out only the wavelength component making no contribution to oscillation out of the fluorescence component emitted from the laser rod 1. As it is clear from the drawing, the filter transmits only 946 nm component out of the fluorescence component and does not transmit the light near 1064 nm making much contribution to oscillation. Such a characteristic can be easily realized by using the interference filter. It is matter of course that a band-pass filter using the dielectric multi-layer film may also be used instead of the interference filter. In addition, the transmittance wavelength may be set to about 1310 nm, which is another emission spectrum of the Nd:YAG.

Still further, although this embodiment has described the configuration that the pumping light blocking filter 75 and the narrow-band transmittance filter 76 are inserted between the optical waveguide medium 73 and the semiconductor photo-detector 7, the optical waveguide medium 73 itself is made up of a material that transmits or absorbs light of a particular wavelength and the medium can function as a filter. Alternatively, the band of the narrow-band transmittance filter 76 is finely divided near the fluorescence wavelength, and the slippage of the fluorescence wavelength, which changes in accordance with the degradation of the laser rod 1, can be measured.

Figure 13:
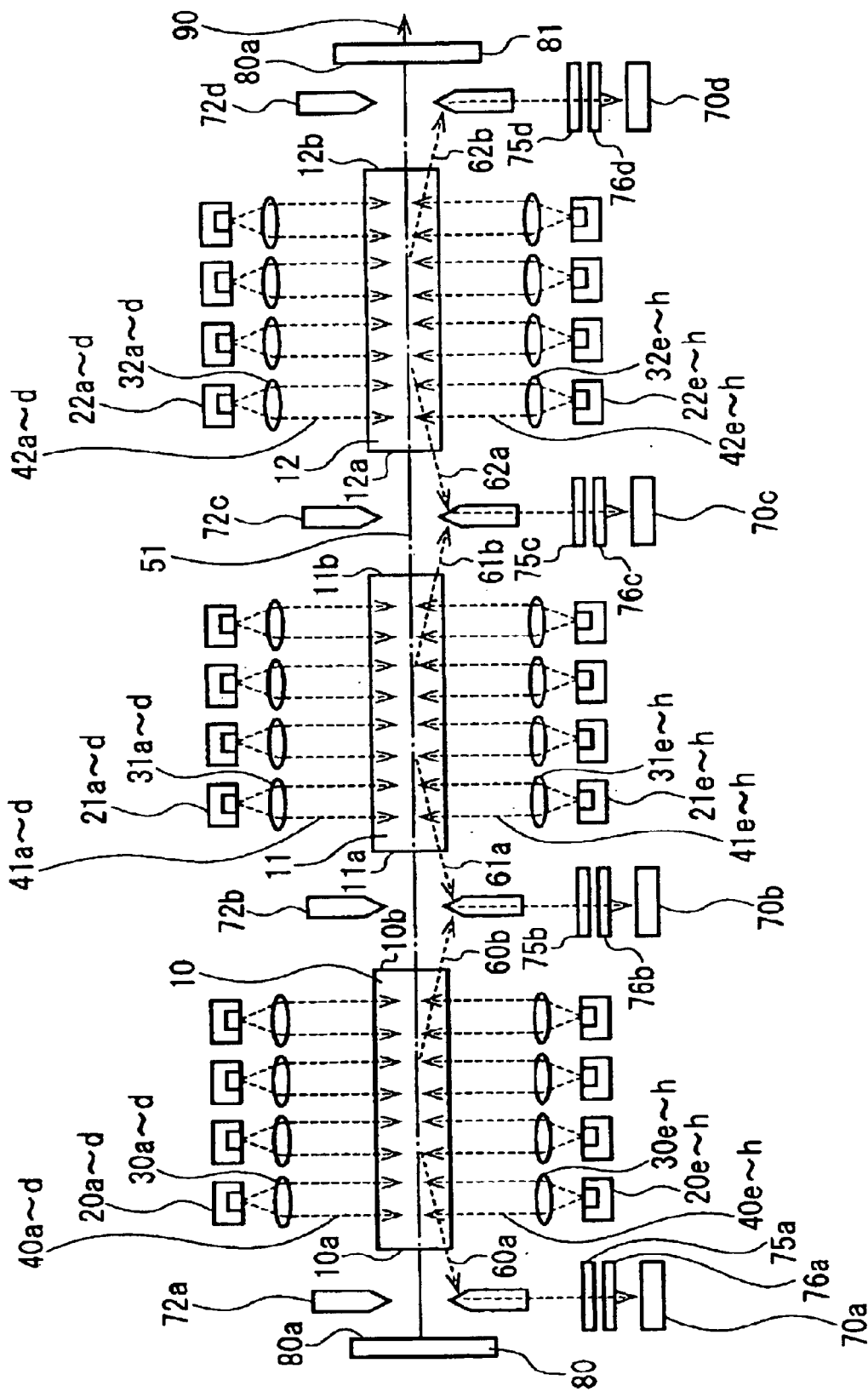
FIG. 13 is a view schematically showing a structure of the LD-pumped solid-state laser apparatus according to a ninth embodiment of the present invention.

Next, the laser-diode-pumped solid-state laser apparatus according to the ninth embodiment of the present invention will be described referring to FIG. 13. FIG. 13 is the view schematically showing the structure of the LD-pumped solid-state laser apparatus according to the ninth embodiment, which shows a cross-section in the direction along the optical axis of the laser oscillation light in the configuration that the pumping light of LD is irradiated along the laser oscillation optical axis of the laser media arranged in series in plural numbers.

As shown in FIG. 13, along the side and longitudinal direction of three Nd:YAG laser rods 10, 11, 12 arranged in a longitudinal direction (Nd concentration: 0.7% at, rod diameter: 5 cm, each rod length: 10 cm, for example), a plurality of laser diode devices 20a to 20h, 21a to 21h, 22a to 22h are disposed. Pumping light 40a to 40h, 41a to 41h, 42a to 42h (wavelength: 808 nm) emitted from the laser diode devices is irradiated into the laser rods 10, 11, 12 after being shaped through optical systems 30a to 30h, 31a to 31h, 32a to 32h respectively.

The solid-state laser resonator has two resonator mirrors 80, 81, and the dielectric multi-layer film having the particular reflectivity for the oscillation light (wavelength: 1064 nm) of the solid-state laser is formed on their end surfaces 80a, 81a opposing to the laser rods. Specifically, the high reflection film having the reflectivity of 99% or more for the wavelength of 1064 nm and the partial reflection film having the reflectivity of 50% are respectively formed on the end surfaces 80a and 81a, for example. The two mirrors 80, 81 and the solid-state laser rods 10 to 12 make up the laser oscillation optical axis shown by the reference numeral 51 in the drawing. Furthermore, the anti-reflection film having the reflectivity of 0.2% or less, for example, for the wavelength of 1064 nm is formed on end surfaces 10a to 12a, 10b to 12b, on which the laser optical axis 51 and each of the laser rods 10 to 12 contact, to prevent the solid-state laser oscillation light from reflecting and diffusing.

Transparent media 72a to 72d for the wavelength of 1064 nm are disposed in a position near the optical axis 51 in the laser resonator and not blocking the optical axis. Each medium has the rotation symmetrical shape surrounding the periphery of the optical axis 51 around the center of the optical axis, and is arranged to propagate fluorescence 60a to 62a, 60b to 62b emitted from the end surface of each of the laser rods 10, 11, 12 in the medium and guide it into the adjacent photo-detectors 70a to 70d. The triangular protrusion is formed on a side opposing to the optical axis of each medium as shown in the drawing, the fluorescence emitted from each laser rod propagates into the medium through its surface while being diffracted or reflected, and finally reaches the photo-detecting surface of the semiconductor photo-detector.

Specifically, the media are arranged such that the medium 72a detects the fluorescence 60a generated by passing through the end surface 10a of the laser rod 10, the medium 72b detects the fluorescence 60b or 61a generated by passing through the end surface 10b of the laser rod 10 or the end surface 11a of the laser rod 11, and the medium 72c detects the fluorescence 61b or 62a generated by passing through the end surface 11b of the laser rod 11 or the end surface 12a of the laser rod 12, and the medium 72d detects the fluorescence 62b generated by passing through the end surface 12b of the laser rod 12.

When the laser rod is long and the number of laser diode device arrays is increased, fluorescence of the LD or the excitation region of the laser rod, which is farther from the semiconductor photo-detector, diffuses due to little directivity. However, by arranging the semiconductor photo-detectors on both end surfaces sandwiching the laser rods 10 to 12, it is possible to know more accurately the information of the laser diode device or the excitation region far from either semiconductor photo-detector.

Moreover, pumping light blocking filters 75a to 75d, which absorb or reflect the wavelength of the pumping light of the laser diode and transmit only the fluorescence emitted from the laser rod, and narrow-band transmittance filters 76a to 76d, which transmit only wavelength component making no contribution to oscillation out of the fluorescence, are inserted between each of the media 72a to 72d and the semiconductor photo-detectors 70a to 70d, and only light out of the fluorescence, which has the wavelength making no contribution to oscillation, reaches the semiconductor photo-detectors for detection. As described, including the two filters in the apparatus can accurately and reliably measure not the pumping light itself but the quantity of fluorescence generated by absorbing the pumping light.

Figure 14:
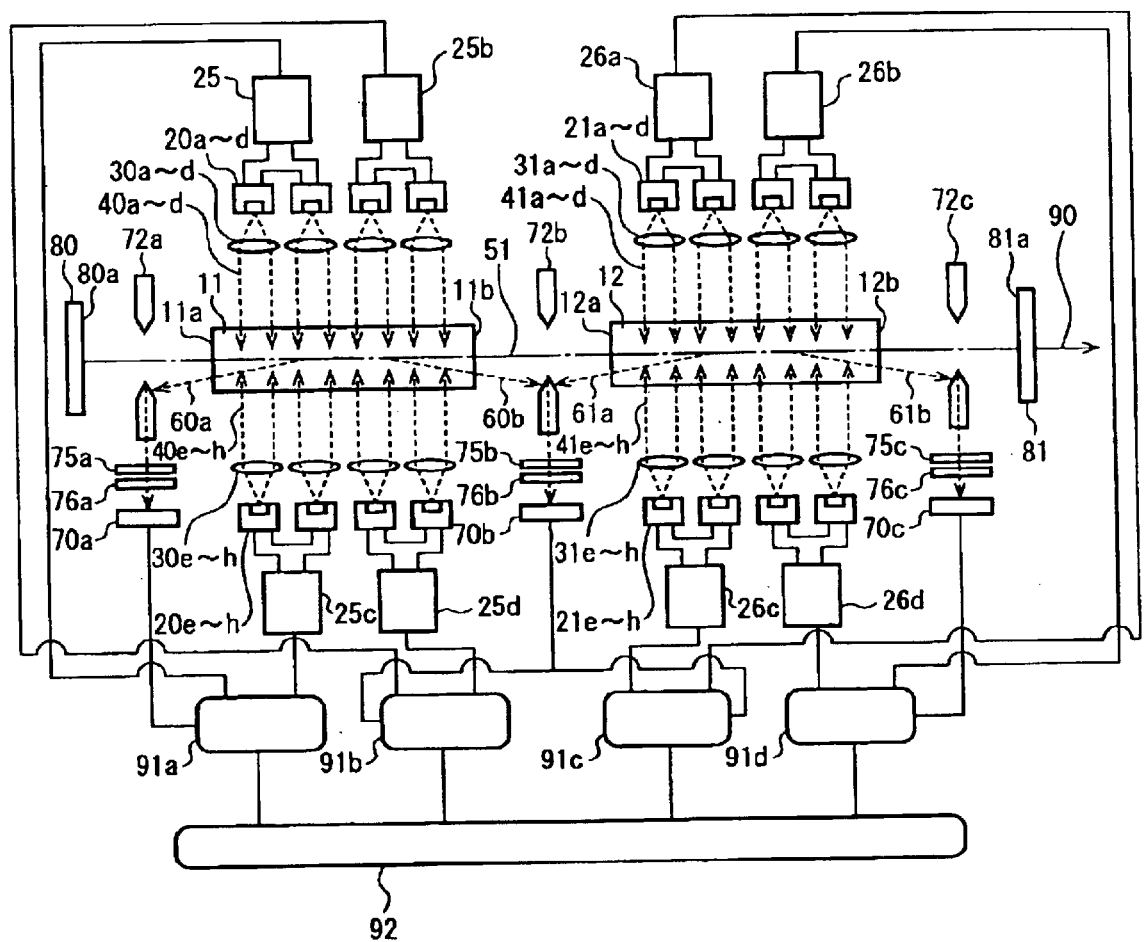
FIG. 14 is a view schematically showing a structure of the LD-pumped solid-state laser apparatus according to a tenth embodiment of the present invention.

Next, the laser-diode-pumped solid-state laser apparatus according to the tenth embodiment of the present invention will be described referring to FIG. 14. FIG. 14 is the view schematically showing the structure of the LD-pumped solid-state laser apparatus according to the tenth embodiment, which shows a cross-section in the direction along the optical axis of the laser oscillation light in the configuration that the pumping light of LD is irradiated along the laser oscillation optical axis of the laser media.

As shown in FIG. 14, along the longitudinal direction of two Nd:YAG laser rods 11, 12 arranged in a longitudinal direction (Nd concentration: 1.0% at, rod diameter: 5 cm, each rod length: 10 cm, for example), a plurality of the laser diode devices 20a to 20h, 21a to 21h are disposed. The pumping light 40a to 40h, 41a to 41h (wavelength: 808 nm) emitted from the laser diode devices is irradiated into the laser rods after being shaped through the optical systems 30a to 30h, 31a to 31h respectively.

The solid-state laser resonator has two resonator mirrors 80, 81, and the dielectric multi-layer film having the particular reflectivity for the oscillation light (wavelength: 1064 nm) of the solid-state laser is formed on their end surfaces 80a, 81a opposing to the laser rods. Specifically, the high reflection film having the reflectivity of 99% or more for the wavelength of 1064 nm and the partial reflection film having the reflectivity of 75% are respectively formed on the end surfaces 80a and 81a, for example. The two mirrors 80, 81 and the solid-state laser rods 11, 12 make up the laser oscillation optical axis shown by the reference numeral 51 in the drawing. Furthermore, the anti-reflection film having the reflectivity of 0.2% or less, for example, for the wavelength of 1064 nm is formed on the end surfaces 11a, 11b, 12a, 12b, on which the laser optical axis 51 and the laser rods 11, 12 contact, to prevent the solid-state laser oscillation light from reflecting and diffusing.

The transparent media 72a to 72c for the wavelength of 1064 nm are disposed in a position near the optical axis 51 in the laser resonator and not blocking the optical axis. The media 72a to 72c surround the periphery of the optical axis 51 to have the rotation symmetrical shape around the optical axis, and the semiconductor photo-detectors 70a to 70c are adjacent to its outside. The triangular protrusion is formed on a side opposing to the optical axis of each of the media 72a to 72c as shown in the drawing, the fluorescence 60a, 60b, 61a, 61b emitted from the laser rods 11, 12 propagate into the media through their surfaces while being diffracted or reflected, and finally reaches the photo-detecting surface of each semiconductor photo-detector.

When the laser rod is long and the number of laser diode device arrays is increased, fluorescence of the LD or the excitation region of the laser rod, which is farther from the semiconductor photo-detector, diffuses due to little directivity. However, by arranging the semiconductor photo-detectors on both end surfaces sandwiching the laser rods 11, 12, it is possible to know more accurately the information of the laser diode device or the excitation region far from either semiconductor photo-detector.

Moreover, the pumping light blocking filters 75a to 75c, which absorb or reflect the wavelength of the pumping light 40a to 40h, 41a to 41h of the laser diode and transmit only the fluorescence emitted from the laser rod, and the narrow-band transmittance filters 76a to 76c, which transmit only wavelength component making no contribution to oscillation out of the fluorescence, are inserted between each of the media 72a to 72c and the semiconductor photo-detectors 70a to 70c, and only light out of the fluorescence, which has the wavelength making no contribution to oscillation, reaches the semiconductor photo-detectors 70a to 70c for detection. As described, including the two filters in the apparatus can accurately measure absorption status of the pumping light from LD.

Then, two laser diode devices are connected in series, which are driven by power sources 25a to 26d individually, as shown in the drawing. Control signal for controlling the current value from outside is supplied from interfaces 91a to 91d to the power sources. Further, an upper control host controls, monitors and records the interfaces.

Next, an example of a basic control flow will be described. On instruction from the control host 92, the power source 25a supplies a current of 25a to the laser diodes 20a, 20b via the interface 91a. At this point, the power sources other than the power source 25a is in downtime. The pumping light 40a, 40b from the laser diode devices 20a, 20b is irradiated on the laser rod 11 after being shaped by the optical systems 30a, 30b. The laser diode light is absorbed by the laser rod 11, and the laser rod 11 emits the fluorescence 60a. The fluorescence is transmitted to the transparent medium 72a for detecting fluorescence, which is closest to the position where the fluorescence is generated, and the fluorescence propagates in the medium 72. Subsequently, the fluorescence reaches the semiconductor photo-detector 70a for detection after passing through the pumping light blocking filter 75a for removing the pumping light and the filter 76a that transmits only wavelength component making no contribution to oscillation out of the fluorescence.

At this point, since only the laser diodes 20a, 20b are driven, the fluorescence quantity detected by the semiconductor photo-detector 70a is the one generated by the excitation from the laser diode devices 20a, 20b. Accordingly, the fluorescence quantity detected is proportional to the absorption quantity of the pumping light of the laser diode devices 20a, 20b. In other words, it is a value that reflects the total quantity of output light from the laser diode devices and the wavelength thereof.

Next, on instruction from the control host 92, the power source 25b energizes the laser diode devices 20c, 20d via the interface 91b in the similar manner. The fluorescence 60b generated at this point is detected by the semiconductor photo-detector 70b through the closest medium 72b. It is necessary that the drive current at this point be selected at the value by which the solid-state laser apparatus does not oscillates.

As in the foregoing, all the drive power sources 25a to 26d is individually driven in order, the closest semiconductor photo-detector detects the fluorescence intensity generated, and its value is recorded in the control host 92. A particular current value, 25a for example, is energized in a reference state, that is, the state where the laser diode devices are new and not degraded at all, and the fluorescence quantity at this point is recorded in the memory of the control host 92. Subsequently, all the drive power sources are driven individually again after passing a certain period of time or when the solid-state laser output has an abnormal value, and the semiconductor photo-detectors detect the intensity of the fluorescence generated at this point in exactly the same pattern. Thus, it is possible to detect the degradation status of each laser diode device by comparing the values with original values. For example, it may be previously determined that a laser diode device driven by the power source is regarded to be degraded when the fluorescence quantity is reduced to 70% or less from the start of using the device, and it should be replaced.

Note that the Nd:YAG laser medium has been exemplified as the laser medium in the foregoing embodiments. However, the laser medium may be one containing any laser-oscillating element such as Yb, Ho, Tm, Cr and Ti, for example, and the parent material may be either crystal such as YLF, YVO4, GGG and GSGG or non-crystal such as glass and ceramic.

Furthermore, although glass has been exemplified as the material of optical waveguide medium, another material may be used as long as it has high transmittance for the pumping light. Particularly, the pumping light propagating in the waveguide plate can efficiently propagate in the plate due to total reflection if high refractive glass to which lead is added is used. A crystal material such as sapphire and YAG not containing a laser element can be also used as a high refractive transparent material. Still further, the shape of the optical waveguide medium has been exemplified in the disc shape, the trapezoidal shape, the elliptic shape and the parabolic shape having a hole. However, any other shapes may be used, and a shape that propagates the fluorescence generated from the laser medium to the photo-detector is included in the scope of claim for patent by the present invention. The shape and the medium are acceptable if they do not lessen the fluorescence during propagation, and the shape is ideal if it converges fluorescence. Optical fiber can be also used since resin like plastic is acceptable. Although the laser rod having the diameter of 5 mm has been used in the embodiments, another size is acceptable and the diameter and the length that are most suitable for the configuration of a required laser apparatus are selected. Further, the oscillation wavelength of the LD used in excitation may not be 808 nm, and the most suitable wavelength is selected taking consideration the configuration of the laser crystal and the pumping distribution.

SDL3470S, for example, manufactured by SDL Inc. of the United States can be used as the laser diode devices, and OPC-A020-MMM-CL manufactured by Opto Power Corporation of the United States and TH-C1720-P manufactured by Tomson-CSF can be also used. TH-C1720-R(4) manufactured by Tomson-CSF, in which four laser diode devices are arranged in an array state, is also acceptable. The laser diode device for 30 W or 40 W can be used since its output may be 20 W or less per 1 cm. In this case, the lifetime of the laser diode device can be lengthened to three to nine times because the device is used on the output half or less the rated output, which can improve the reliability of the solid-state laser apparatus.

Furthermore, a pair of the pumping light blocking filter, which attenuates the wavelength of the pumping light, and the narrow-band transmittance filter, which selectively transmits only the emission line wavelength of the fluorescence of the solid-state laser medium making no contribution to oscillation, has been used in the foregoing embodiments. However, the former filter may be omitted if the pumping light does not reach the semiconductor photo-detector due to the excitation configuration. Alternatively, if a non-transmittance wavelength band of the narrow-band transmittance filter, which selectively transmits only the emission line wavelength of the fluorescence of the solid-state laser rod, reaches the wavelength of the pumping light, the former filter may be omitted similarly since only the latter filter does not transmit the pumping light. Although an example Si has been described for the semiconductor photo-detector, Ge, GaAs, InGaAs or another semiconductor material may be used. A material with which detection can be performed in the highest sensitivity in accordance with the wavelength of the fluorescence is selected.

Either filter can be omitted when the pumping light does not reach the semiconductor photo-detector due to the excitation configuration and the oscillation light does not degrade the performance of the photo-detector even if the solid-state laser oscillates. Moreover, an ND filter that attenuates all light such that the oscillation does not degrade the photo-detector may be inserted alternatively, or a diffusion plate may also be inserted, for example.

As described above, in the laser-diode-pumped solid-state laser apparatus, in which the laser rod absorbs and amplifies the pumping light from the laser diode, the reflection mirror, the optical waveguide medium or the like is provided at a position near the optical axis in the resonator and not blocking the optical axis to guide the fluorescence emitted from the laser rod into the semiconductor photo-detector. Thus, it is possible to know the excitation status accurately, and the status and lifetime of the laser diode for excitation can be measured and controlled while the laser apparatus is in operation.

In addition, in the present invention, the pumping light from the laser diode is not directly measured but the fluorescence form the laser rod is measured. Accordingly, the present invention can be applied to either a configuration in which optical axes of the pumping light and the laser beam match or a configuration in which the axes are perpendicular with each other, not depending on the positional relation between the laser diode and the laser rod and the pumping method.

Further, in the present invention, the semiconductor photo-detector that measures the fluorescence does not need to be arranged in the resonator or near the laser optical axis, but the fluorescence may be guided by the reflection mirror or the optical waveguide medium. Therefore, the fluorescence can be accurately detected even if the distance between the laser rod and the resonator mirror is narrow.

Still further, the optical waveguide medium is formed in a doughnut shape so as to surround the periphery of the optical axis and the opening diameter inside the optical waveguide medium is made smaller than the diameter of the laser rod. Thus, oscillation of beam spreading in a wide angle can be restricted, and detection of fluorescence intensity can be achieved simultaneously with improvement of the laser beam quality.

Still further, in the present invention, providing the pumping light blocking filter and the narrow-band transmittance filter in the previous step of the semiconductor photo-detector prevents the pumping light from being made incident in the photo-detector, and only fluorescence making no contribution to laser oscillation can be detected. Thus, absorption status of the pumping light can be measured accurately.

Moreover, in the present invention, a plurality of laser diode devices are divided into a plurality of groups, the power source for driving the laser diode devices is individually provided for each group, and the instruction from the control host controls the power source. Therefore, the degradation status of the laser diode device can be individually diagnosed.

What is claimed is:

1. A laser diode pumped solid state laser apparatus, comprising:
    a laser diode light source providing a pumping light;
    a solid-state laser medium that receives the pumping light and provides a laser oscillation light from ends thereof;
    two resonator reflective surfaces at respective said ends of said laser medium and that reflect the laser oscillation light provided from the respective ends of said laser medium back to said ends, said laser medium being between and aligned with said two reflective surfaces so as to define an optical axis for the laser oscillation light through said ends and said reflective surfaces; and
    a fluorescence detector that includes a fluorescence receiving surface that receives fluorescence emitted by said laser medium directly from one of said ends of said laser medium, said fluorescence receiving surface being between said laser medium and one of said reflective surfaces and directly adjacent to said optical axis without blocking said optical axis.

2. The apparatus of claim 1, wherein said fluorescence detector comprises a photodetector and said fluorescence receiving surface, and wherein said fluorescence receiving surface is a mirror that reflects the fluorescence received directly from said one of said ends to said photodetector.

3. The apparatus of claim 1, wherein said fluorescence detector comprises a photodetector and a waveguide comprising said fluorescence receiving surface, and wherein said waveguide directs the fluorescence received directly from said one of said ends to said photodetector.

4. The apparatus of claim 1, wherein said fluorescence detector comprises a photodetector and a transparent medium that completely surrounds said optical axis and that comprises said fluorescence receiving surface.

5. The apparatus of claim 4, wherein said transparent medium has a radially external surface with a reflective film thereon that directs the fluorescence to said photodetector.

6. The apparatus of claim 4, wherein said transparent medium is round.

7. The apparatus of claim 4, wherein said transparent medium is trapezoidal.

8. The apparatus of claim 4, wherein said transparent medium is generally elliptical.

9. A method of diagnosing a status of a laser diode pumped solid state laser apparatus that includes a laser diode light source providing a pumping light, a solid-state laser medium that receives the pumping light and provides a laser oscillation light from ends thereof, and two resonator reflective surfaces at respective that ends of the laser medium and that reflect the laser oscillation light provided from the respective ends of the laser medium back to the ends, the laser medium being between and aligned with the two reflective surfaces so as to define an optical axis for the laser oscillation light through the ends and the reflective surfaces, the method comprising the steps of:

detecting fluorescence emitted by the laser medium directly from one of the ends of the laser medium, the fluorescence being detected with a fluorescence detector that includes a fluorescence receiving surface that receives the fluorescence, where the fluorescence receiving surface is between the laser medium and one of the reflective surfaces and directly adjacent to the optical axis without blocking the optical axis; and comparing the detected fluorescence with a reference value to diagnose the status of the laser apparatus.

10. The method of claim 9, wherein the fluorescence detector includes a photodetector and a mirror that is the fluorescence receiving surface, and wherein the detecting step comprises the step of reflecting from the mirror to the photodetector the fluorescence received directly from the one of the ends.

11. The method of claim 9, wherein the fluorescence detector includes a photodetector and a waveguide that includes the fluorescence receiving surface, and wherein the detecting step comprises the step of directing the fluorescence received directly from the one of the ends through the waveguide to the photodetector.

12. The method of claim 9, wherein the fluorescence detector includes a photodetector and a transparent medium that completely surrounds the optical axis and that includes the fluorescence receiving surface, and where the detecting step comprises the steps of receiving the fluorescence completely around the optical axis and directing the received fluorescence to the photodetector.

* * * * *